(12) United States Patent
Shiraiwa et al.

(10) Patent No.: US 9,776,085 B2
(45) Date of Patent: Oct. 3, 2017

(54) INFORMATION PROCESSING SYSTEM, INFORMATION PROCESSING DEVICE, SERVER MACHINE, RECORDING MEDIUM AND INFORMATION PROCESSING METHOD

(71) Applicant: NINTENDO CO., LTD., Kyoto (JP)

(72) Inventors: Yusuke Shiraiwa, Kyoto (JP); Kenta Sato, Kyoto (JP); Shoichi Obayashi, Kyoto (JP); Ryuhei Matsuura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 550 days.

(21) Appl. No.: 14/051,485

(22) Filed: Oct. 11, 2013

(65) Prior Publication Data

US 2014/0364206 A1    Dec. 11, 2014

(30) Foreign Application Priority Data

Jun. 7, 2013    (JP) .................................. 2013-121265

(51) Int. Cl.
*A63F 13/00*    (2014.01)
*A63F 13/352*    (2014.01)
(Continued)

(52) U.S. Cl.
CPC .......... *A63F 13/352* (2014.09); *A63F 13/355* (2014.09); *A63F 13/497* (2014.09); *A63F 13/87* (2014.09)

(58) Field of Classification Search
CPC .... A63F 13/00; A63F 13/12; A63F 2300/634; G06Q 50/01
USPC ..................................................... 463/40–43
See application file for complete search history.

(56) References Cited

U.S. PATENT DOCUMENTS

| 5,850,352 A | 12/1998 | Moezzi et al. | |
| 2006/0148571 A1* | 7/2006 | Hossack | A63F 13/10 463/43 |

(Continued)

FOREIGN PATENT DOCUMENTS

| JP | 2008-172745 | 7/2008 |
| JP | 2009-10652 | 1/2009 |

(Continued)

OTHER PUBLICATIONS

U.S. Appl. No. 14/051,482, filed Oct. 11, 2013.

(Continued)

*Primary Examiner* — David L Lewis
*Assistant Examiner* — Eric M Thomas
(74) *Attorney, Agent, or Firm* — Nixon & Vanderhye PC

(57) ABSTRACT

An example system includes: a plurality of information processing devices each having a game processing unit for performing processing involved in a game, a reproduction data generating unit for generating reproduction data to be used for reproducing game play, a relevant information accepting unit for accepting input of relevant information concerning the reproduction data, and a post transmitting unit for transmitting reproduction data and relevant information; and a server machine having a post receiving unit for receiving reproduction data and relevant information transmitted from the information processing device, a storage unit for storing reproduction data and relevant information in association with each other, and a relevant information transmitting unit for transmitting relevant information stored in the storage unit to the information processing device.

38 Claims, 21 Drawing Sheets

(51) Int. Cl.
*A63F 13/355* (2014.01)
*A63F 13/497* (2014.01)
*A63F 13/87* (2014.01)

(56) References Cited

U.S. PATENT DOCUMENTS

| | | | |
|---|---|---|---|
| 2008/0268961 | A1 | 10/2008 | Brook et al. |
| 2009/0093313 | A1 | 4/2009 | Yabuki et al. |
| 2009/0191971 | A1* | 7/2009 | Avent ................................ 3/335 |
| 2009/0254843 | A1* | 10/2009 | Van Wie et al. ............... 715/757 |
| 2010/0035686 | A1* | 2/2010 | Nakashima ........... A63F 13/215 463/36 |
| 2010/0160040 | A1 | 6/2010 | Ikeda |
| 2010/0250256 | A1* | 9/2010 | Hiraishi ................ G06T 13/205 704/276 |
| 2012/0094737 | A1* | 4/2012 | Barclay ............... G07F 17/3213 463/20 |

FOREIGN PATENT DOCUMENTS

| | | |
|---|---|---|
| JP | 2009-089737 | 4/2009 |
| JP | 2010-142305 | 7/2010 |
| JP | 2011-72735 | 4/2011 |
| JP | 2012-118919 | 6/2012 |
| JP | 5183823 | 1/2013 |

OTHER PUBLICATIONS

U.S. Appl. No. 14/051,489, filed Oct. 11, 2013.
Office Action (7 pgs.) dated May 22, 2015 issued in co-pending U.S. Appl. No. 14/051,482.
Office Action (10 pgs.) dated Jun. 5, 2015 issued in co-pending U.S. Appl. No. 14/051,489.
U.S. Appl. No. 14/051,489, filed Oct. 11, 2013, Information Processing System, Server Machine, Information Processing Device, Recording Medium and Information Processing Method.
U.S. Appl. No. 14/051,482, filed Oct. 11, 2013, Information Processing System, Information Processing Device, Recording Medium and Information Display Method.
U.S. Appl. No. 14/051,485, filed Oct. 11, 2013, Information Processing System, Information Processing Device, Server Machine, Recording Medium and Information Processing Method.
Office Action dated Feb. 2, 2016 issued in co-pending U.S. Appl. No. 14/051,482 (12 pgs.).
Office Action dated Feb. 2, 2016 issued in co-pending U.S. Appl. No. 14/051,489 (11 pgs.).
Office Action dated Aug. 1, 2016 issued in co-pending U.S. Appl. No. 14/051,489 (11 pgs.).
Office Action dated Sep. 27, 2016 issued in co-pending U.S. Appl. No. 14/051,482 (12 pgs.).
Uemura, Daisuke et al. (2011). Haishin-oukoku (Live video streaming Kingdom)—Live video streaming, realize Communication service on avatar. IEICE Technical Report, vol. 110, No. 456, pp. 141-146 (with English abstract thereof) (2011).
Obayashi, et al., Notice of Allowance dated May 5, 2017, issued in related U.S. Appl. No. 14/051,482 (11 pages.).
Shiraiwa, et al., Notice of Allowance dated Feb. 15, 2017, issued in related U.S. Appl. No. 14/051,489 (8 pages.).

* cited by examiner

FIG. 8

REPLAY DATA MANAGEMENT TABLE

| REPLAY DATA STORAGE LOCATION | COMMENT STORAGE LOCATION | POSTING USER INFORMATION | MOVING IMAGE DATA STORAGE LOCATION | OTHER INFORMATION |
|---|---|---|---|---|
| ⋮ | ⋮ | ⋮ | ⋮ | ⋮ |
| ADDRESS A 1 | ADDRESS B 1 | USER A | ADDRESS C 1 | |
| ADDRESS A 2 | ADDRESS B 2 | USER A | ADDRESS C 2 | |
| ADDRESS A 3 | ADDRESS B 3 | USER B | — | |
| ⋮ | ⋮ | ⋮ | ⋮ | ⋮ |

COMMENT MANAGEMENT TABLE

| COMMENT STORAGE LOCATION | COMMENT TYPE | ORIGINAL COMMENT | DERIVATIVE COMMENT |
|---|---|---|---|
| ⋮ | ⋮ | ⋮ | ⋮ |
| ADDRESS B 1 | POSTING | — | ADDRESS D 1 |
| ADDRESS D 1 | BULLETIN BOARD | ADDRESS B 1 | — |
| ADDRESS B 2 | BROWSING | — | ADDRESS E 1 |
| ADDRESS E 1 | USER | ADDRESS B 2 | — |
| ⋮ | ⋮ | ⋮ | ⋮ |

| DISPLAY TIMING | POSTING USER INFORMATION | OTHER INFORMATION |
|---|---|---|
| ⋮ | ⋮ | ⋮ |
| — | USER A | |
| — | USER C | |
| — | USER A | |
| 1 : 1 3 | USER D | |
| ⋮ | ⋮ | ⋮ |

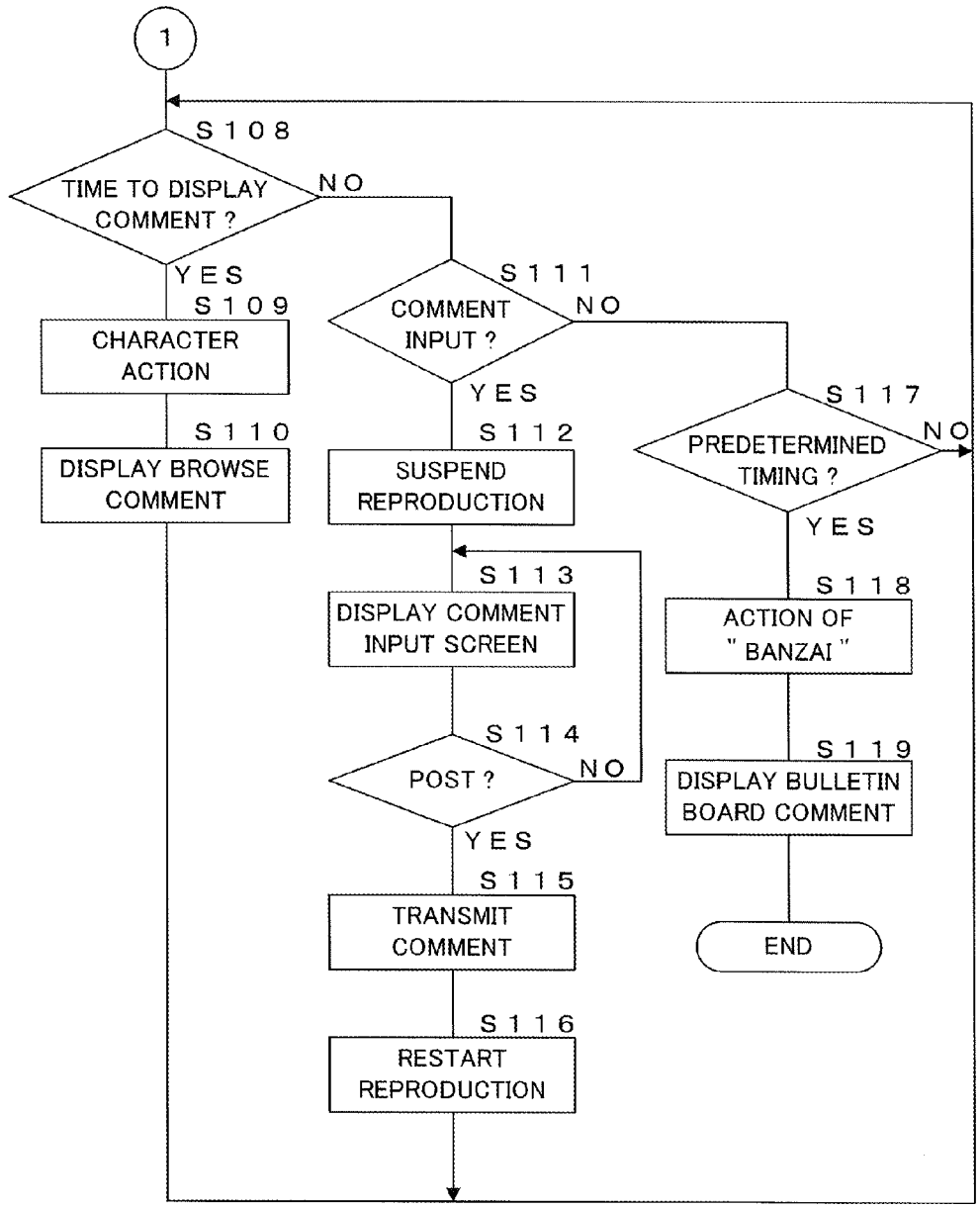

INFORMATION PROCESSING SYSTEM, INFORMATION PROCESSING DEVICE, SERVER MACHINE, RECORDING MEDIUM AND INFORMATION PROCESSING METHOD

CROSS-REFERENCE TO RELATED APPLICATIONS

This application is based upon and claims the benefit of priority of the prior Japanese Patent Application No. 2013-121265, filed on Jun. 7, 2013, the entire contents of which are incorporated herein by reference.

FIELD

The technology herein relates to: an information processing system for allowing the user to post data concerning a game to a server machine and causing the server machine to perform storing, distributing and the like of the posted data; an information processing device; a server machine, a recording medium; and an information processing method.

BACKGROUND AND SUMMARY

Conventionally, a game machine has been equipped with a communication function for providing pleasure of fighting, cooperating or the like in a game via the Internet or the like. It is also possible to enjoy fighting, cooperating or the like in a game, which uses a communication function, with a mobile telephone, a tablet terminal device, a PC (Personal Computer) and the like, which have a game program installed therein, as is the case with a game machine. In recent years, a system for causing a server machine to distribute various kinds of data involved in a game using a communication function of a game machine has been put to practical use.

According to an aspect of the embodiment, an information processing system is provided with: a plurality of information processing devices each having a game processing unit for performing processing involved in a game, a reproduction data generating unit for generating reproduction data to be used for reproducing game play processed by the game processing unit, a relevant information accepting unit for accepting input of relevant information concerning the reproduction data generated by the reproduction data generating unit, and a post transmitting unit for transmitting reproduction data generated by the reproduction data generating unit and relevant information accepted by the relevant information accepting unit; and a server machine having a post receiving unit for receiving reproduction data and relevant information transmitted from the information processing device, a storage unit for storing reproduction data and relevant information received by the post receiving unit in association with each other, and a relevant information transmitting unit for transmitting relevant information stored in the storage unit to the information processing device, wherein the information processing device has a display processing unit for providing predetermined display at the display unit on the basis of relevant information transmitted from the server machine.

The object and advantages of the invention will be realized and attained by means of the elements and combinations particularly pointed out in the claims. It is to be understood that both the foregoing general description and the following detailed description are exemplary and explanatory and are not restrictive of the invention.

These and other objects, features, aspects and advantages of the technology herein will become clearer through the following detailed explanation with reference to the accompanying drawings.

BRIEF DESCRIPTION OF THE DRAWINGS

FIG. 8 shows an example non-limiting schematic view for illustrating an example of a replay data management table;

FIG. 21 shows an example non-limiting flowchart for illustrating the procedures in game reproduction processing to be performed by a game machine.

DETAILED DESCRIPTION OF NON-LIMITING EXAMPLE EMBODIMENTS

<System Outline>

Figure 1:
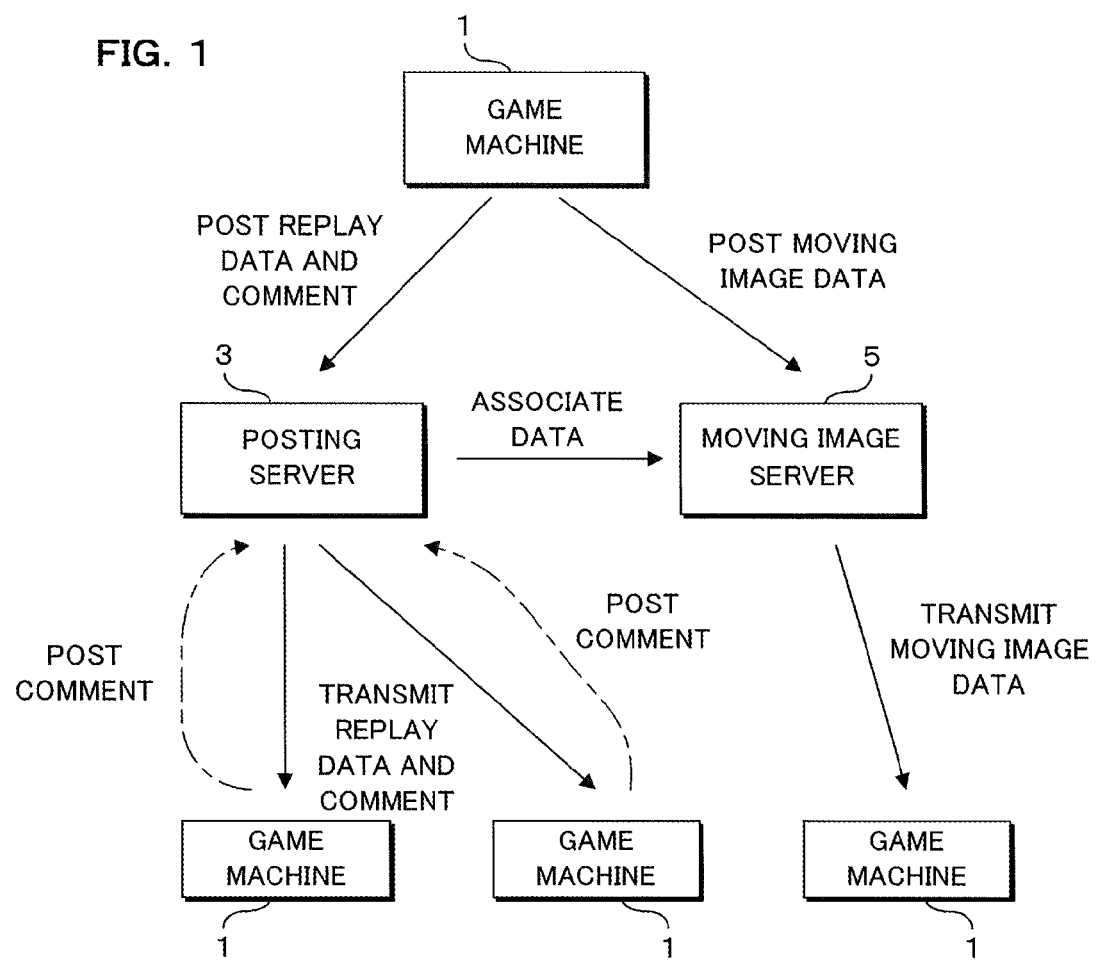
FIG. 1 shows an example non-limiting schematic view for explaining the outline of an information processing system according to an embodiment.

FIG. 1 shows an example non-limiting schematic view for explaining the outline of an information processing system according to an embodiment. In the information processing system according to the present embodiment, a plurality of game machines 1 communicate with a posting server 3 and a moving image server 5. This allows the information processing system to share data involved in game replay. When the user plays a game, the game machine 1 generates replay data to be used for reproducing the game play situation. Replay data in the present embodiment can include: information such as positions, changes of positions, movement loci, actions taken, shapes, colors and textures of objects including a player character, an enemy character, a background, an obstacle and the like in the game; information of game operation by the user; and the like. The replay data are data which enable reproduction of the game play situation when being read in by the game machine 1, a game program for realizing a similar game or the like. The user uses the game machine 1 to create a comment for the replay data and post the replay data and the comment to the posting server 3.

The game machine 1 can convert the generated replay data into moving image data. In the present embodiment, moving image data are data of a format such as the MPEG (Moving Picture Experts Group) or H.264, for example. Moving image data are data which can be played by a device such as a PC, a smartphone or a tablet terminal device, for example, that cannot realize a similar game. The user uses the game machine 1 to convert replay data into moving image data and post moving image data obtained by conversion to the moving image server 5.

The posting server 3 stores the replay data and the comment posted from a plurality of game machines 1 in association with each other. When both of replay data and moving image data are posted at a game machine 1, the posting server 3 stores information concerning a storage location or the like of the moving image data. This allows the posting server 3 to associate the replay data and the moving image data with each other. The posting server 3 transmits the stored replay data and comment to a plurality of game machines 1. Similarly, the moving image server 5 stores moving image data posted from a plurality of game machines 1. The moving image server 5 transmits the stored moving image data to a plurality of game machines 1.

A game machine 1 can download and acquire replay data and a comment, which suit the taste of the user, from the replay data and the comments stored in the posting server 3. On the basis of the acquired replay data, the game machine 1 reproduces and displays the game play situation. The user can browse the game play reproduced at the game machine 1, create a comment for the game play, and post the comment to the posting server 3. When accepting posting of a comment from the game machine 1, the posting server 3 stores the comment in association with the replay data. A comment to be transmitted by the posting server 3 together with replay data may include not only a comment by a posting user who has posted the replay data but also a comment by a browsing user.

Similarly, the game machine 1 can acquire and browse moving image data from the moving image server 5. Transmission of moving image data by the moving image server 5 may be achieved by a method in which the game machine 1 downloads moving image data, or may be achieved by so-called streaming distribution. Transmission of moving image data by the moving image server 5 can be used not only by the game machine 1 but also by a device, which is provided with a function for playing of moving image data and a function to communicate with the moving image server 5.

<Device Configuration>

Figure 2:
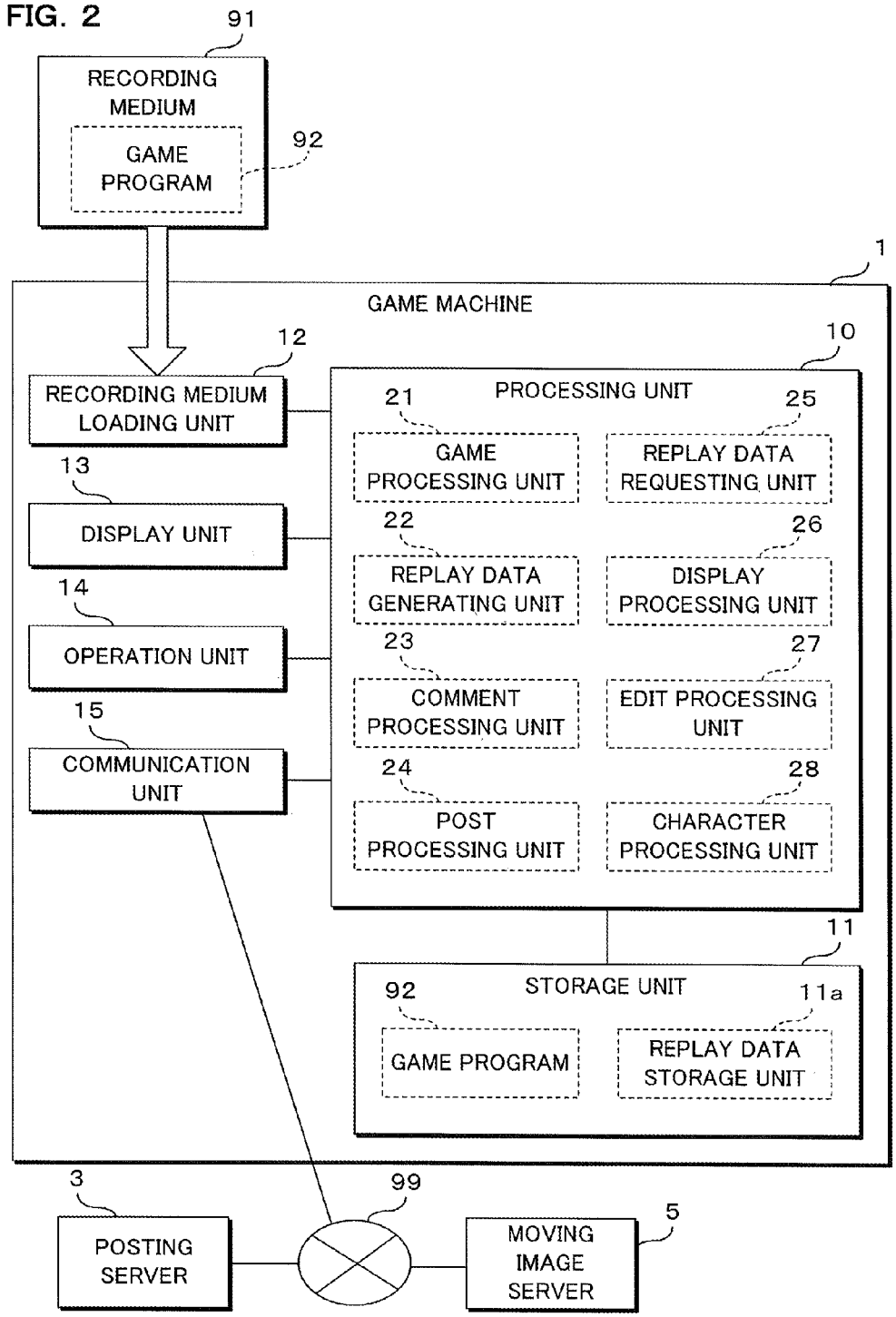
FIG. 2 shows an example non-limiting block diagram for illustrating the configuration of a game machine according to an embodiment.

FIG. 2 shows an example non-limiting block diagram for illustrating the configuration of the game machine 1 according to the present embodiment. The game machine 1 is composed of a processing unit 10, a storage unit 11, a recording medium loading unit 12, a display unit 13, an operation unit 14, a communication unit 15 and the like. The processing unit 10 is constituted of an arithmetic processing device such as a CPU (Central Processing Unit). The processing unit 10 reads out and executes a game program 92 stored in the storage unit 11 or a game program 92 recorded in a recording medium 91 mounted on the recording medium loading unit 12. This allows the processing unit 10 to perform various kinds of information processing involved in a game. For example, the processing unit 10 performs processing for accepting operation performed at the operation unit 14. For another example, the processing unit 10 performs processing for judging a game in response to accepted operation. For another example, the processing unit 10 performs processing for generating a game image to be displayed at the display unit 13 in response to accepted operation, an event in a game or the like.

The storage unit 11 is constituted of a non-volatile storage device. The storage unit 11 can store a program such as the game program 92 and various kinds of data to be used for executing programs. The storage unit 11 is provided with a replay data storage unit 11a for storing replay data. The recording medium loading unit 12 is constructed in such a manner that the recording medium 91 such as a memory card can be attached thereto and detached therefrom. The processing unit 10 can read out the game program 92 and various kinds of other data from the recording medium 91 mounted on the recording medium loading unit 12. The display unit 13 is constituted by a liquid crystal panel or the like and displays an image given from the processing unit 10. The operation unit 14 is, for example, a push button or a touch panel provided at the display unit 13. The operation unit 14 notifies the processing unit 10 of the content of operation such as pushing down of a button or contact to a touch panel, for example, performed by the user.

The communication unit 15 is connected with a network 99 such as the Internet using a wireless LAN (Local Area Network) or the like and transmits and receives data to and from the posting server 3, the moving image server 5 or the like via the network 99. For example, by communicating with the posting server 3 at the communication unit 15, the game machine 1 can post and acquire replay data of a game. For another example, by communicating with the moving image server 5 at the communication unit 15, the game machine 1 can post and acquire moving image data.

Regarding the game machine 1 according to the present embodiment, the processing unit 10 executes the game program 92. This provides the processing unit 10 with a game processing unit 21, a replay data generating unit 22, a comment processing unit 23, a post processing unit 24, a replay data requesting unit 25, a display processing unit 26, an edit processing unit 27, a character processing unit 28 and the like serving as software function blocks.

The game processing unit 21 performs various kinds of judgment processing, event processing or the like concerning a game in response to operation by the user or the like accepted at the operation unit 14. The game processing unit 21 performs processing for reproducing game play on the basis of replay data stored in the replay data storage unit 11a of the storage unit 11. The replay data generating unit 22 performs processing for generating replay data to be used for reproducing a game played at the game processing unit 21 and storing the replay data in the storage unit 11. The replay data generating unit 22 performs processing for converting replay data into moving image data of an MPEG format or the like.

The comment processing unit 23 performs processing for accepting input of a comment by the user for replay data to be posted to the posting server 3. In the present embodiment, the comment processing unit 23 may accept a comment which is not only letter string (text) information but also image information hand-drawn by the user. In the present embodiment, information, input of which is accepted by the comment processing unit 23 and which is associated with replay data, will be referred to as a comment. Here, a comment can include information such as a title attached to replay data. Regarding the game machine 1, the game processing unit 21 can reproduce game play on the basis of replay data which is acquired from the posting server 3 and stored in the storage unit 11. The comment processing unit 23 performs processing for accepting input of a comment by the user for the reproduced game play.

The post processing unit 24 transmits the replay data generated by the replay data generating unit 22 and the comment for the replay data accepted by the comment processing unit 23 from the communication unit 15 to the posting server 3. This allows the post processing unit 24 to perform processing for posting the replay data and the comment. The post processing unit 24 transmits moving image data, which is obtained by conversion of the replay data by the replay data generating unit 22, from the communication unit 15 to the moving image server 5. This allows the post processing unit 24 to perform processing for posting the moving image data. The post processing unit 24 transmits a comment by a browsing user, which is accepted by the comment processing unit 23, for replay data acquired from the posting server 3, from the communication unit 15 to the posting server 3. This allows the post processing unit 24 to perform processing for posting the comment.

The replay data requesting unit 25 makes a transmission request for replay data to the posting server 3 or makes a transmission request for moving image data to the moving image server 5 in response to a request from the user of the game machine 1.

The display processing unit 26 generates a game screen corresponding to a result of processing by the game processing unit 21 and gives the game screen to the display unit 13. This allows the display processing unit 26 to perform processing for displaying the game screen at the display unit 13. The display processing unit 26 performs processing for displaying reproduction of game play by the game processing unit 21 at the display unit 13 on the basis of replay data stored in the storage unit 11. The display processing unit 26 displays a list of replay data stored in the storage unit 11. The display processing unit 26 displays a list of replay data to be transmitted by the posting server 3 or moving image data to be transmitted by the moving image server 5.

The edit processing unit 27 performs edit processing for replay data stored in the storage unit 11 in accordance with operation by the user. The edit processing unit 27 performs edit processing such as changing of a viewpoint or reduction of a reproduction time of game play to be reproduced on the basis of the replay data, for example. The edit processing unit 27 stores new replay data generated by edit processing in the storage unit 11. A target of edit processing by the edit processing unit 27 includes both of replay data generated by the replay data generating unit 22 provided therein and replay data acquired from the posting server 3.

The display processing unit 26 displays game play, which is reproduced by the game processing unit 21 on the basis of replay data, at the display unit 13. In this process, the character processing unit 28 performs processing involved in a character object to be used for displaying a comment related to the replay data. In the present embodiment, the character processing unit 28 displays one or a plurality of character objects together with reproduction of game play. The character processing unit 28 displays a comment by displaying a word balloon, which has a comment written therein, near each character object. The character processing unit 28 performs processing for causing a character object to take a predetermined action or the like at a predetermined time point in reproduction of game play.

Figure 3:
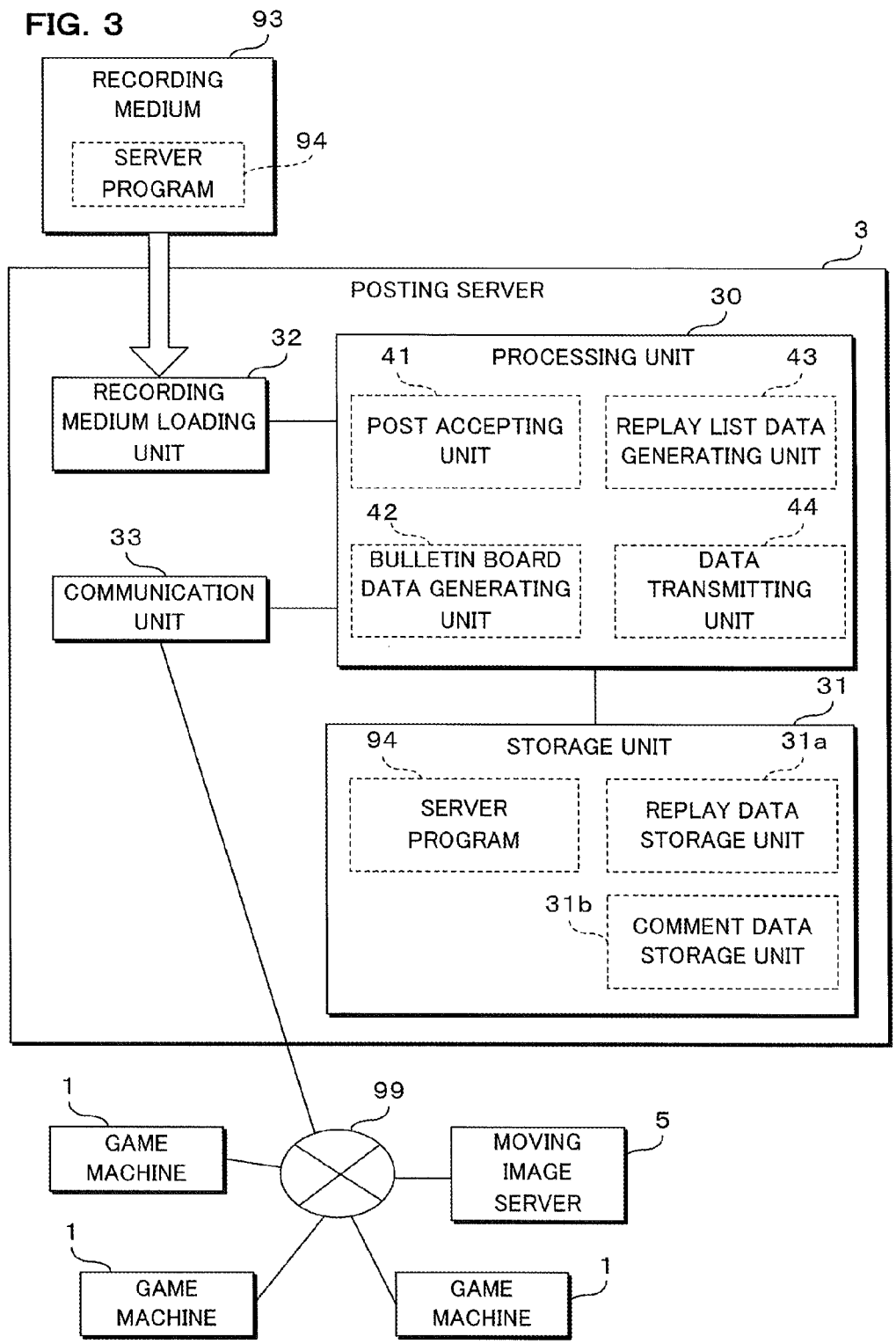
FIG. 3 shows an example non-limiting block diagram for illustrating the configuration of a posting server according to an embodiment.

FIG. 3 shows an example non-limiting block diagram for illustrating the configuration of the posting server 3 according to the present embodiment. The posting server 3 is composed with a processing unit 30, a storage unit 31, a recording medium loading unit 32, a communication unit 33 and the like. The processing unit 30 is constituted of an arithmetic processing device. The processing unit 30 performs processing such as post acceptance and transmittance of replay data by reading out and executing a server program 94 stored in the storage unit 31. The storage unit 31 is constituted of a non-volatile storage device. The storage unit 31 can store a program such as the server program 94 and various kinds of data. In the present embodiment, the storage unit 31 has a replay data storage unit 31a for storing replay data posted from the game machine 1 and a comment data storage unit 31b for storing comment data.

The recording medium loading unit 32 is constructed in such a manner that a recording medium 93 in a disk shape or the like can be attached thereto and detached therefrom. The processing unit 30 can read out a server program 94 and various kinds of other data from the recording medium 93 mounted on the recording medium loading unit 32 and install the server program 94 and the data into the storage unit 31. The communication unit 33 transmits and receives data to and from the game machine 1 or the moving image server 5 via the network 99 such as the Internet. For example, the posting server 3 receives replay data and a comment posted from the game machine 1 at the communication unit 33 and stores the replay data and the comment in the storage unit 31. For example, the posting server 3 transmits the replay data and comment stored in the storage unit 31 from the communication unit 33 to the game machine 1 in response to a request from the game machine 1.

Regarding the posting server 3 according to the present embodiment, the processing unit 30 executes the server program 94. This provides the processing unit 30 with a post accepting unit 41, a bulletin board data generating unit 42, a replay list data generating unit 43, a data transmitting unit 44 and the like as software function blocks.

The post accepting unit 41 performs processing for accepting posting of a comment and replay data from the game machine 1. The post accepting unit 41 performs processing for accepting posting of a comment by a browsing user for transmitted replay data. The post accepting unit 41 stores replay data, posting of which has been accepted, in the replay data storage unit 31*a* of the storage unit 31. The post accepting unit 41 stores a comment in the comment data storage unit 31*b*.

The bulletin board data generating unit 42 performs processing for generating data to be used for displaying a bulletin board concerning posting of replay data of a game, for a game machine 1, which has accessed the posting server 3. In the present embodiment, a comment by a posting user posted together with replay data, a comment by a browsing user who has browsed the replay data and the like are displayed in relation to each other on a bulletin board. The user can post a new comment for a displayed comment or the like on a bulletin board.

The replay list data generating unit 43 performs processing for generating data to be used for displaying a list of stored replay data, for a game machine 1 which has accessed the posting server 3. The replay list data generating unit 43 selects some pieces of replay data from the replay data stored in the storage unit 31, using a predetermined condition such as newly-arrived replay data or popular replay data, for example. The replay list data generating unit 43 creates replay list data including a thumbnail image or the like of the selected replay data and transmits the replay list data to the game machine 1. The game machine 1 can receive the replay list data from the posting server 3 and display a list of stored replay data or the like. Replay list data to be generated by the replay list data generating unit 43 may include information concerning not only replay data stored in the posting server 3 but also moving image data stored in the moving image server 5.

The data transmitting unit 44 performs processing for transmitting replay data, comment data and the like stored in the storage unit 31 in response to a request from the game machine 1. The data transmitting unit 44 performs processing for transmitting bulletin board display data generated by the bulletin board data generating unit 42 and replay list data generated by the replay list data generating unit 43 to the game machine 1.

Figure 4:
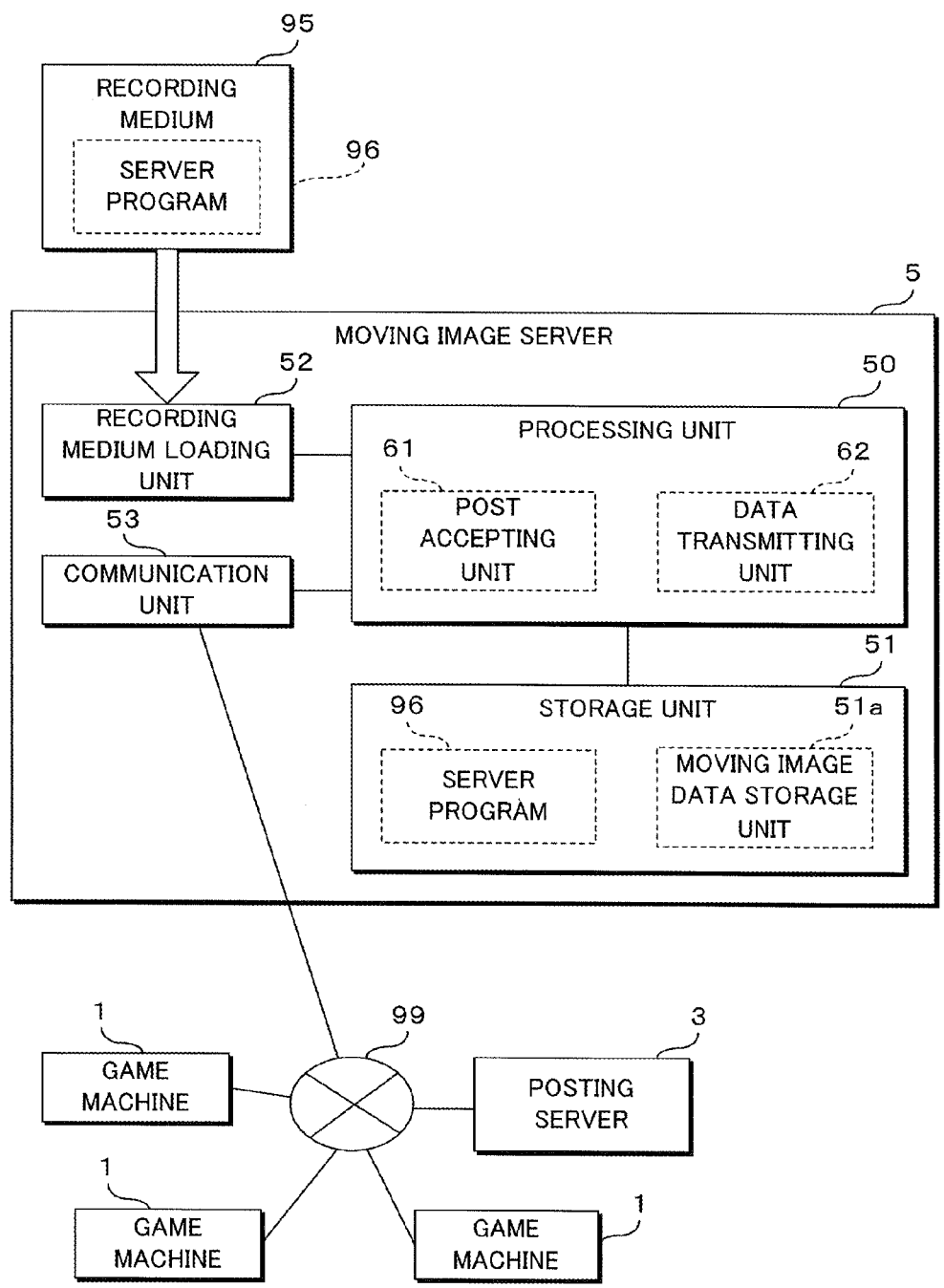
FIG. 4 shows an example non-limiting block diagram for illustrating the configuration of a moving image server according to an embodiment.

FIG. 4 shows an example non-limiting block diagram for illustrating the configuration of the moving image server 5 according to the present embodiment. The moving image server 5 is composed with a processing unit 50, a storage unit 51, a recording medium loading unit 52, a communication unit 53 and the like. The processing unit 50 is constituted of an arithmetic processing device. The processing unit 50 performs processing such as post acceptance and transmission of moving image data by reading out and executing a server program 96 stored in the storage unit 51. The storage unit 51 is constituted of a non-volatile storage device and can store a program such as the server program 96 and various kinds of data. In the present embodiment, the storage unit 51 has a moving image data storage unit 51*a* for storing moving image data posted from the game machine 1.

The recording medium loading unit 52 is constructed in such a manner that a recording medium 95 in a disk shape or the like can be attached thereto and detached therefrom. The processing unit 50 can read out the server program 96 and various kinds of other data from the recording medium 95 mounted on the recording medium loading unit 52 and install the server program 96 and the data into the storage unit 51. The communication unit 53 transmits and receives data to and from the game machine 1 or the posting server 3 via the network 99 such as the Internet. For example, the moving image server 5 receives moving image data posted from the game machine 1 at the communication unit 53 and stores the moving image data in the storage unit 51. For another example, the moving image server 5 transmits moving image data stored in the storage unit 51 from the communication unit 53 to the game machine 1 in response to a request from the game machine 1.

Regarding the moving image server 5 according to the present embodiment, the processing unit 50 executes the server program 96. This provides the processing unit 50 with a post accepting unit 61, a data transmitting unit 62 and the like as software function blocks. The post accepting unit 61 performs processing for accepting posting of moving image data from the game machine 1. The post accepting unit 61 stores moving image data, posting of which has been accepted, in the moving image data storage unit 51*a* of the storage unit 51. The data transmitting unit 62 performs processing for transmitting moving image data or the like stored in the storage unit 51 in response to a request from the game machine 1.

<Replay Data Generation>

In the information processing system according to the present embodiment, the game program 92 is executed at the game machine 1 and the user plays a game implemented by the game processing unit 21. In the process of the play, replay data is generated by the replay data generating unit 22. It is to be noted that the following description will explain an example wherein the game machine 1 provides a racing game in which one or a plurality of vehicles run on a predetermined course in a three-dimensional virtual space and compete on the ranking, a driving time or the like. This is, however, only an example and the technology herein can be applied to other games.

The game processing unit 21 of the game machine 1 acquires information such as the shape, color and texture of a vehicle to run, information such as the shape and texture of a course on which the vehicle runs, and information such as the shape, color and texture of other objects such as obstacles placed on the course. Such information is stored in the storage unit 11 together with the game program 92. The game processing unit 21 constructs a three-dimensional virtual space to be used for implementation of a game, on the basis of the acquired information. The display processing unit 26 generates a two-dimensional image based on a viewpoint from a virtual camera placed in a three-dimensional virtual space. The display processing unit 26 displays a game screen by displaying the generated two-dimensional image at the display unit 13. The game processing unit 21 changes the position of a vehicle in response to operation by the user, such as steering and acceleration/deceleration, at the operation unit 14. Regarding a vehicle which is not operated by the user, the game processing unit 21 changes the position of the vehicle according to a predetermined think routine or the like. The game processing unit 21 performs processing by setting a period while a vehicle runs from the start position to the goal position on the course as one game. The game processing unit 21 displays running ranking, a running time and the like as a game result.

The replay data generating unit 22 generates replay data by collecting information such as the position, orientation and speed of a vehicle to be generated in the process of game processing by the game processing unit 21 or information such as the content of operation by the user for one game. Replay data generated by the replay data generating unit 22 includes data, which enables reproduction of the play situation of a game that has already been played and display of the play situation at the display unit 13, when being read in by the game processing unit 21. Replay data is generally divided into two types: one is based on information such as the position, orientation and speed of an object and the other is based on information such as the content of operation by the user. In the present embodiment, the following description will explain a case where replay data includes information such as the position, orientation and speed of an object. The replay data, however, may also include information such as the content of operation by the user. The replay data generating unit 22 stores the generated replay data in the replay data storage unit 11a of the storage unit 11.

The replay data generating unit 22 can generate replay data, which has a reduced reproduction time, on the basis of generated replay data of one game. In the present embodiment, replay data having a reduced reproduction time will be referred to as highlight data. The original replay data having a reproduction time which is not reduced will be referred to as full replay data. When referring simply to replay data, the replay data may be full replay data or may be highlight data. Replay data can mean both of full replay data and highlight data.

Figure 5:
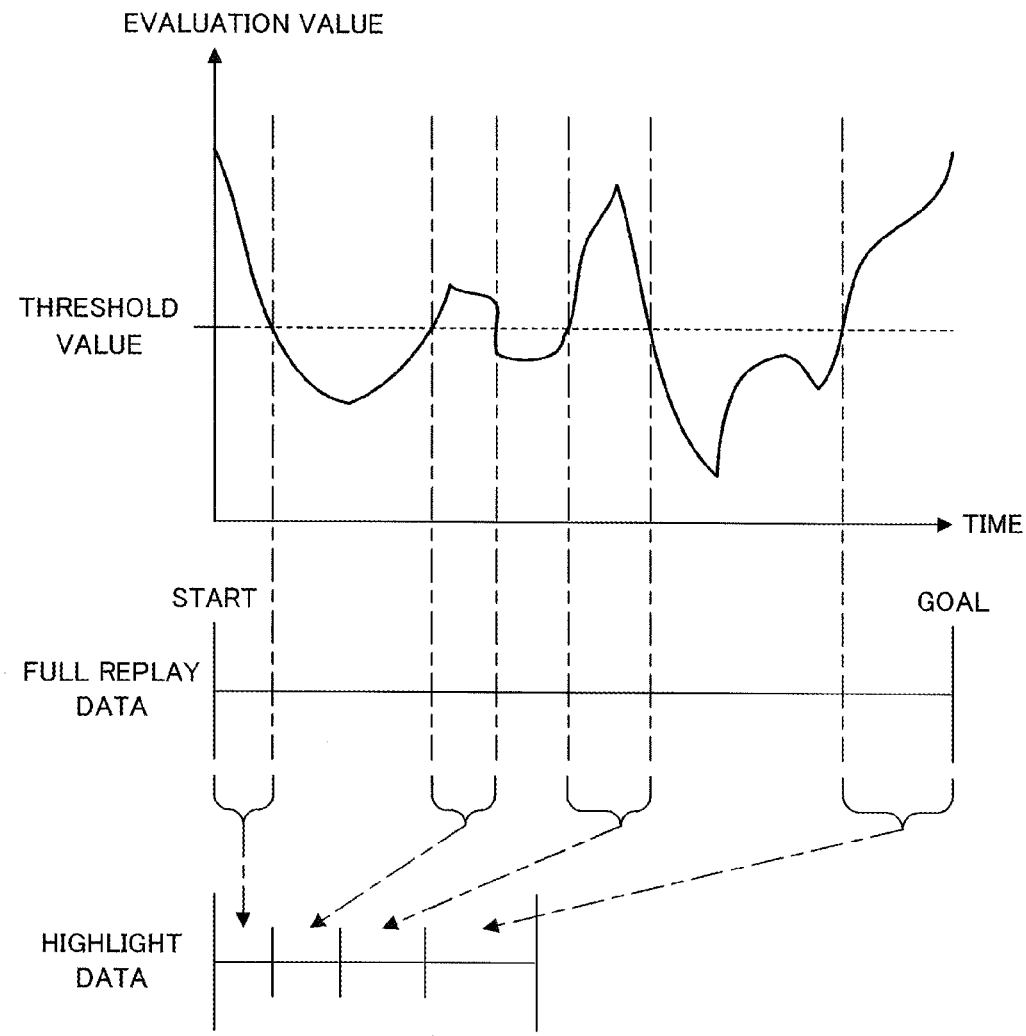
FIG. 5 shows an example non-limiting schematic view for explaining a highlight data generation method by a replay data generating unit.

FIG. 5 shows an example non-limiting schematic view for explaining a highlight data generation method by the replay data generating unit 22. The replay data generating unit 22 calculates an evaluation value and a change thereof regarding one game. An evaluation value is a value obtained by quantifying the degree of heat or the like in a game. An evaluation value is added when a specific condition is satisfied. A specific condition is, for example, when one vehicle overtakes another vehicle, when a plurality of vehicles collide with each other, or when one vehicle goes off the course in a game. Regarding an evaluation value, a specific value is preliminarily set at predetermined positions such as the start, goal or chokepoints on a course, for example, and the set value is added when a vehicle passes over the predetermined positions on a course.

The replay data generating unit 22 repeatedly calculates an evaluation value at predetermined periods in one game. An example of a calculated evaluation value is illustrated at an upper part of FIG. 5. The replay data generating unit 22 extracts data from full replay data for a section where a calculated evaluation value exceeds a threshold value. The replay data generating unit 22 combines the extracted data with each other to generate highlight data. A threshold value may not be a specific value. A threshold value may be increased or decreased depending on, for example, a reproduction time of replay of generated highlight data. A threshold value may be the mean value of calculated evaluation values, for example.

The replay data generating unit 22 extracts a part from full replay data to generate highlight data. This enables reduction in data volume of replay data and reduction in communication volume in the process of posting of replay data to the posting server 3. The replay data generating unit 22 may store only the generated highlight data in the storage unit 11 or may store both of the full replay data and the highlight data in the storage unit 11.

When a plurality of vehicles participate in a game, the replay data generating unit 22 creates highlight data. When only one vehicle or vehicles the number of which is smaller than a predetermined value run in a game, the replay data generating unit 22 stores full replay data in the storage unit 11 without creating highlight data. A game in which only one vehicle or vehicles the number of which is smaller than a predetermined value run is, for example, a game played in a mode such as a time trial. This allows the replay data generating unit 22 to store full replay data in a case where the number of vehicles is small and data volume is low, and to store highlight data so as to reduce data volume in a case where the number of vehicles is large and data volume is high.

Highlight data may be created not only automatically by the replay data generating unit 22 on the basis of an evaluation value but also by the user extracting favorite sections from full replay data. In such a case, highlight data is generated by the edit processing unit 27 of the game machine 1. The edit processing unit 27 generates highlight data from full replay data in response to edit operation by the user accepted at the operation unit 14, or more specifically operation such as time specification of data to be extracted. The edit processing unit 27 stores the generated highlight data in the storage unit 11. The edit processing unit 27 can perform other edit processing such as changing of a viewpoint (virtual camera position) in the process of replay display, for example, in response to operation by the user.

Figure 6:
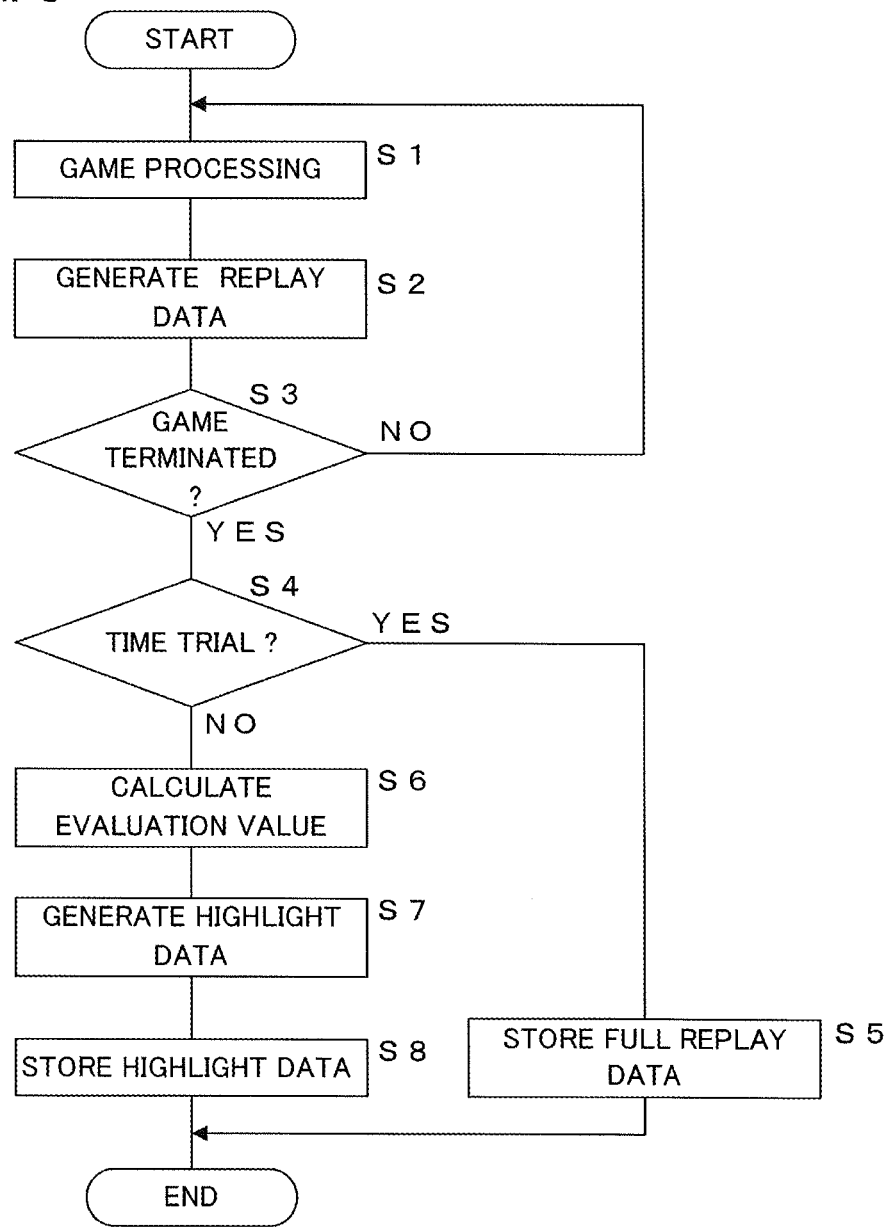
FIG. 6 shows an example non-limiting flowchart for illustrating the procedures in replay data generation processing by a game machine.

FIG. 6 shows an example non-limiting flowchart for illustrating the procedures in replay data generation processing by the game machine 1. After initiation of a game, the processing unit 10 of the game machine 1 performs game processing by the game processing unit 21 (step S1). The replay data generating unit 22 of the processing unit 10 acquires information such as the position, orientation and speed of a vehicle to be generated with game processing by the game processing unit 21, so as to generate replay data (step S2). The processing unit 10 judges whether a game has been terminated or not (step S3). When the game has not been terminated (S3: NO), the processing unit 10 returns the processing to the step S1 and continues game processing.

When the game has been terminated (S3: YES), the replay data generating unit 22 of the processing unit 10 judges whether a played game is a time trial or not (step S4). When a played game is a time trial (S4: YES), the replay data generating unit 22 stores full replay data in the storage unit 11 (step S5) and terminates the processing. When a played game is not a time trial (S4: NO), the replay data generating unit 22 calculates an evaluation value at predetermined periods of in-game time (step S6). The replay data generating unit 22 extracts partial data from full replay data on the basis of a result of comparison between the calculated evaluation value and a threshold value, and generates highlight data (step S7). The replay data generating unit 22 stores the generated highlight data in the storage unit 11 as replay data (step S8) and terminates the processing.

<Replay Data Posting>

The user of the game machine 1 can cause the display unit 13 to display reproduction of game play on the basis of replay data stored in the storage unit 11. The user of the game machine 1 can publish his/her own replay data to other users by posting the replay data to the posting server 3. The user can initiate post processing by performing operation to select an item of replay data posting from a menu (not illustrated) displayed at the display unit 13 by execution of the game program 92 at the operation unit 14, for example.

Post processing of replay data is performed by the post processing unit 24 of the processing unit 10. The post processing unit 24 presents a list of replay data stored in the storage unit 11 to the user by thumbnail display or the like. The post processing unit 24 accepts selection of replay data to be posted, from the list of replay data. In the present embodiment, not only replay data is posted from the game machine 1 to the posting server 3 but also moving image data corresponding to replay data can be posted to the moving image server 5. The post processing unit 24 inquires whether moving image data corresponding to the selected replay data to be posted is to be generated and posted to the moving image server 5 or not. When the user selects to post moving image data, the post processing unit 24 performs processing for converting replay data to be posted into moving image data of a format such as the MPEG or H.264.

The post processing unit 24 reads out replay data to be posted from the storage unit 11 and transmits the replay data from the communication unit 15 to the posting server 3. When conversion into moving image data is being performed, the post processing unit 24 may transmit replay data after completion of the conversion processing of moving image data. Alternatively, the post processing unit 24 may transmit replay data in parallel with the conversion processing of moving image data. After completion of conversion processing of moving image data, the post processing unit 24 transmits moving image data from the communication unit 15 to the moving image server 5.

In the present embodiment, the user can attach a comment to replay data to be posted. Acceptance of a comment is performed by the comment processing unit 23 of the processing unit 10. The comment processing unit 23 displays a comment input screen at the display unit 13 and accepts input of a comment in response to operation by the user at the operation unit 14. In the present embodiment, the comment processing unit 23 can accept an image inputted by hand-drawing as a comment in addition to a comment by text input. The comment processing unit 23 gives text data, input of which has been accepted, or a comment of image data to the post processing unit 24. Input acceptance processing of a comment by the comment processing unit 23 may be performed in parallel with the replay data transmission processing by the post processing unit 24, the conversion processing into moving image data, the moving image data transmittance processing and the like.

After transmitting the replay data to the posting server 3, the post processing unit 24 transmits a comment, input of which has been accepted by the comment processing unit 23, to the posting server 3.

Figure 7:
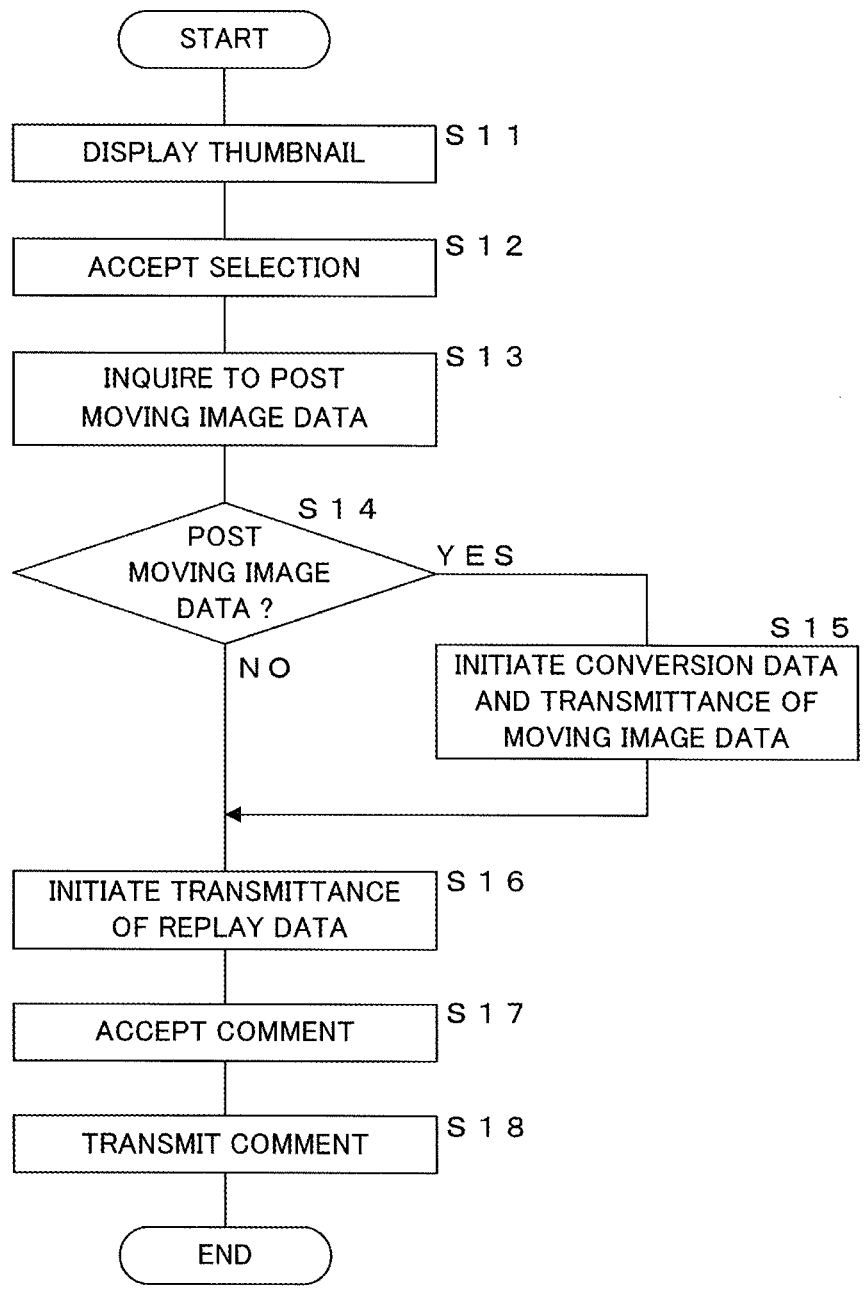
FIG. 7 shows an example non-limiting flowchart for illustrating the procedures in replay data post processing by a game machine.

FIG. 7 shows an example non-limiting flowchart for illustrating the procedures in replay data post processing by the game machine 1. The post processing unit 24 of the processing unit 10 in the game machine 1 performs thumbnail display of replay data stored in the storage unit 11 (step S11). The post processing unit 24 accepts selection of replay data to be posted (step S12). After selection is accepted, the post processing unit 24 inquires whether selected replay data is to be posted to the moving image server 5 as moving image data or not (step S13). The post processing unit 24 judges whether a selection to post moving image data is made or not (step S14). When a selection to post moving image data is made (S14: YES), the post processing unit 24 initiates conversion from replay data into moving image data and transmittance of moving image data obtained by conversion to the moving image server 5 (step S15). When a selection not to post moving image data is made (S14: NO) or after conversion into moving image data and transmittance are initiated at the step S15, the post processing unit 24 initiates transmittance of replay data to the posting server 3 (step S16).

After transmittance of replay data by the post processing unit 24 is initiated, the comment processing unit 23 of the processing unit 10 performs input acceptance of a comment to be attached to the replay data (step S17). The comment processing unit 23 gives the accepted comment to the post processing unit 24. The post processing unit 24 transmits the given comment to the posting server 3 (step S18) and terminates the processing. When transmission of replay data has not been completed in the step S18, the post processing unit 24 may transmit the comment after completion of transmittance of replay data.

<Replay Data Post Acceptance>

Replay data and a comment posted from the game machine 1 are accepted at the posting server 3. Acceptance processing of a post is performed at the post accepting unit 41 of the processing unit 30. The post accepting unit 41 stores replay data, which has been transmitted from the game machine 1 and received at the communication unit 33, in the replay data storage unit 31a of the storage unit 31. The post accepting unit 41 stores a received comment in the comment data storage unit 31b. The replay data storage unit 31a stores a replay data management table to be used for managing a plurality of pieces of posted replay data. The comment data storage unit 31b stores a comment management table to be used for managing a plurality of posted comments. The post accepting unit 41 updates the replay data management table and the comment management table in the process of storing of the posted replay data and comment.

FIG. 8 shows an example non-limiting schematic view for illustrating an example of a replay data management table. In the replay data management table, a replay data storage location, a comment storage location, posting user information, a moving image data storage location, other information and the like are stored in association with each other. A replay data storage location is information of an address where replay data is stored in the replay data storage unit 31a of the storage unit 31. A replay data storage location may further include information such as the size of replay data. A comment storage location is information of an address of the comment data storage unit 31b wherein a comment attached to replay data by a posting user is stored.

Posting user information is information concerning a user who has posted replay data. Posting user information may include, for example, a user ID (IDentifier), an image to be displayed as a portrait of the user, or information concerning a character to be displayed as an alter ego of the user. A moving image data storage location is information to be set when moving image data is created together with replay data and posted to the moving image server 5. A moving image data storage location is address information of the moving image server 5 wherein corresponding moving image data is stored. Address information to be set as a moving image data storage location may include information such as a URL (Uniform Resource Locator) or an IP (Internet Protocol) address of the moving image server 5. A moving image data storage location has only to be information to allow the posting server 3 to access moving image data. Other information can include, for example, date-and-time information of posting of replay data, or information such as the name of a played game.

Figure 9:
FIG. 9 shows an example non-limiting schematic view for illustrating an example of a comment management table.

FIG. 9 shows an example non-limiting schematic view for illustrating an example of a comment management table. In the comment management table, a comment storage location, a comment type, an original comment, a derivative comment, display timing, posting user information, other information and the like are stored in association with each other. A comment storage location is information of an address where a comment is stored in the comment data storage unit 31b of the storage unit 31.

As a comment type, one type is set from three types of posting, a bulletin board and browsing in the present embodiment. A post comment is a comment attached by the user in the process of posting of replay data as described above. In the present embodiment, the posting server 3 can select some post comments from post comments stored in the storage unit 31, using a condition such as new arrival ranking or popularity ranking. The posting server 3 can display the selected post comments at the display unit 13 of the game machine 1 as a list. This allows the posting server 3 to introduce a comment posted together with replay data to the user of the game machine 1. In the present embodiment, list display of post comments will be referred to as a bulletin board. The user of the game machine 1 can attach a comment to a post comment displayed on a bulletin board. A comment posted on a bulletin board is a bulletin board comment. In the present embodiment, the user of the game machine 1 can download replay data transmitted by the posting server 3 so as to browse reproduction of a game. The user of the game machine 1 can post a comment during or before/after browsing of reproduction of a game, and such a comment is a browse comment.

An original comment is information to be set for a bulletin board comment and a browse comment. An original comment is address information of a storage location of a post comment that is the original to which these comments have been attached. A derivative comment is information to be set for a post comment. A derivative comment is address information of a storage location of a bulletin board comment and a browse comment attached to a post comment. Though only one original comment exists, a plurality of derivative comments may exist.

In the present embodiment, the game machine 1 displays a browse comment, which has been attached to replay data, in the process of displaying reproduction of a game on the basis of the replay data. Display timing of a browse comment can be specified by a posting user of the browse comment. Display timing in the comment management table is information to be set for a browse comment. Display timing is information of a display time (a time in reproduction time of a game) specified by a posting user of a browse comment.

Posting user information is information concerning a user who has posted a comment. Posting user information can include, for example, a user ID, an image to be displayed as a portrait of the user, or information concerning a character to be displayed as an alter ego of the user. Other information can include, for example, date-and-time information of posting of a comment.

Figure 10:
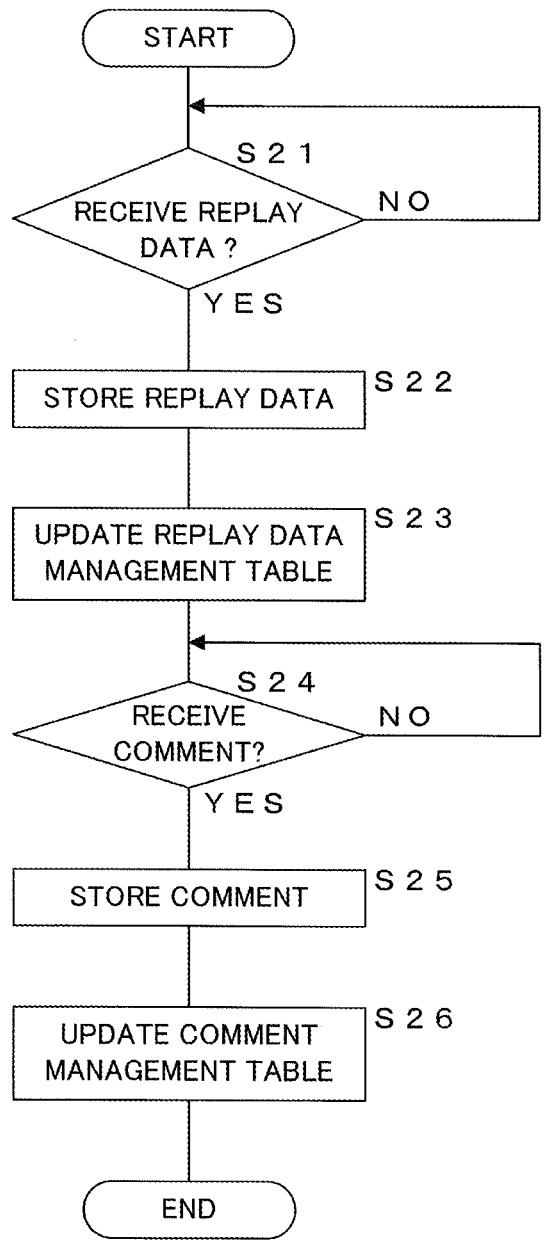
FIG. 10 shows an example non-limiting flowchart for illustrating the procedures in post acceptance processing of replay data and a comment to be performed by a posting server.

FIG. 10 shows an example non-limiting flowchart for illustrating the procedures in post acceptance processing of replay data and a comment to be performed by the posting server 3. The post accepting unit 41 of the processing unit 30 in the posting server 3 judges whether replay data transmitted from the game machine 1 has been received at the communication unit 33 or not (step S21). When replay data has not been received (S21: NO), the post accepting unit 41 waits until replay data is received. When replay data has been received (S21: YES), the post accepting unit 41 stores the received replay data in the replay data storage unit 31a of the storage unit 31 (step S22). The post accepting unit 41 updates the replay data management table (step S23).

The post accepting unit 41 judges whether a comment transmitted from the game machine 1 has been received at the communication unit 33 or not (step S24). When a comment has not been received (S24: NO), the post accepting unit 41 waits until a comment is received. When a comment has been received (S24: YES), the post accepting unit 41 stores the received comment in the comment storage unit 31b of the storage unit 31 (step S25). The post accepting unit 41 updates the comment management table (step S26) and terminates the processing.

<Post Acceptance and Transmittance of Moving Image Data>

When moving image data is posted from the game machine 1, the moving image data is accepted at the moving image server 5. Acceptance processing of posting moving image data is performed at the post accepting unit 61 of the processing unit 50 in the moving image server 5. The post accepting unit 61 stores the moving image data, which has been transmitted from the game machine 1 and received at the communication unit 53, in the moving image data storage unit 51a of the storage unit 51. The moving image data storage unit 51a stores a moving image data management table to be used for managing a plurality of pieces of posted moving image data. The post accepting unit 61 updates the moving image data management table in the process of storing of posted moving image data. Stored in the moving image data management table are address information of a storage location of moving image data, information concerning a posting user who has posted the moving image data and the like, though not illustrated.

The moving image server 5 performs processing for transmitting moving image data, which is stored in the storage unit 51, from the data transmitting unit 62 of the processing unit 50. In the present embodiment, moving image data to be transmitted by the moving image server 5 can be reproduced not only by the game machine 1 but also by any device having a moving image play function. For this reason, the moving image server 5 transmits moving image data not only to the game machine 1 but also to another device.

A user who wants to view moving image data uses an information processing device having a communication function and a moving image play function. The information processing device includes the game machine 1. The information processing device accesses the moving image server 5 via the network 99 such as the Internet. The data transmitting unit 62 of the moving image server 5 transmits data to be used for displaying a home page for moving image transmission to an information processing device which has accessed the moving image server 5. When receiving the data, the information processing device displays a home page for moving image transmission using a function such as a browser. The information processing device accepts selection of a moving image, which is to be replayed, by the user. When a moving image is selected, the information processing device gives a viewing request for moving image data to the moving image server 5. When a viewing request is given to the moving image server 5, the data transmitting unit 62 of the moving image server 5 reads out moving image data, which is involved in the viewing request, from the moving image data storage unit 51a. The data transmitting unit 62 transmits the read-out moving image data to the information processing device which has issued the viewing request. The information processing device can display reproduction of game play by receiving and playing moving image data from the moving image server 5.

Regarding transmission of moving image data by the moving image server 5 which is an existing technique, detailed explanation will be omitted. Transmission of moving image data by the moving image server 5 may be achieved by a method in which the information processing device downloads and replays the moving image data. The moving image server 5 may achieve transmission of moving image data by so-called streaming distribution or by another method.

<Bulletin Board Display>

The posting server 3 transmits replay data stored in the replay data storage unit 31a of the storage unit 31. In the present embodiment, the posting server 3 performs transmission by two methods. The first transmission method is transmission via a bulletin board. The posting server 3 transmits data to be used for displaying a bulletin board to a game machine 1 which has accessed the posting server 3. In the present embodiment, a bulletin board to be obtained from the posting server 3 is displayed by a function such as a browser of the game machine 1. For this reason, not only the game machine 1 but also another information processing device can display a bulletin board by accessing the posting server 3. Data to be used for displaying a bulletin board is generated by the bulletin board data generating unit 42 of the processing unit 30 in the posting server 3.

The user of the game machine 1 can display a bulletin board at the display unit 13 by, for example, selecting an item of bulletin board display from a menu displayed at the display unit 13. Regarding the processing unit 10 of the game machine 1, the replay data requesting unit 25 gives a display request for a bulletin board to the posting server 3 when an item of bulletin board display is selected. When the posting server 3 receives the display request, the processing unit 30 of the posting server 3 selects some comments from post comments stored in the comment data storage unit 31b of the storage unit 31, using a condition such as new arrival ranking or popularity ranking. The bulletin board data generating unit 42 generates data to be used for displaying the selected post comments and relevant bulletin board comments as a bulletin board. The bulletin board data generating unit 42 transmits the generated data to a game machine 1 which has given the display request. The bulletin board data generating unit 42 refers to the replay data management table and comment management table described above and generates data to be used for bulletin board display. When receiving the data from the posting server 3, the game machine 1 performs display processing of a bulletin board by a function such as a browser. Similar procedures are performed in a case where an information processing device other than the game machine 1 displays a bulletin board.

Figure 11:
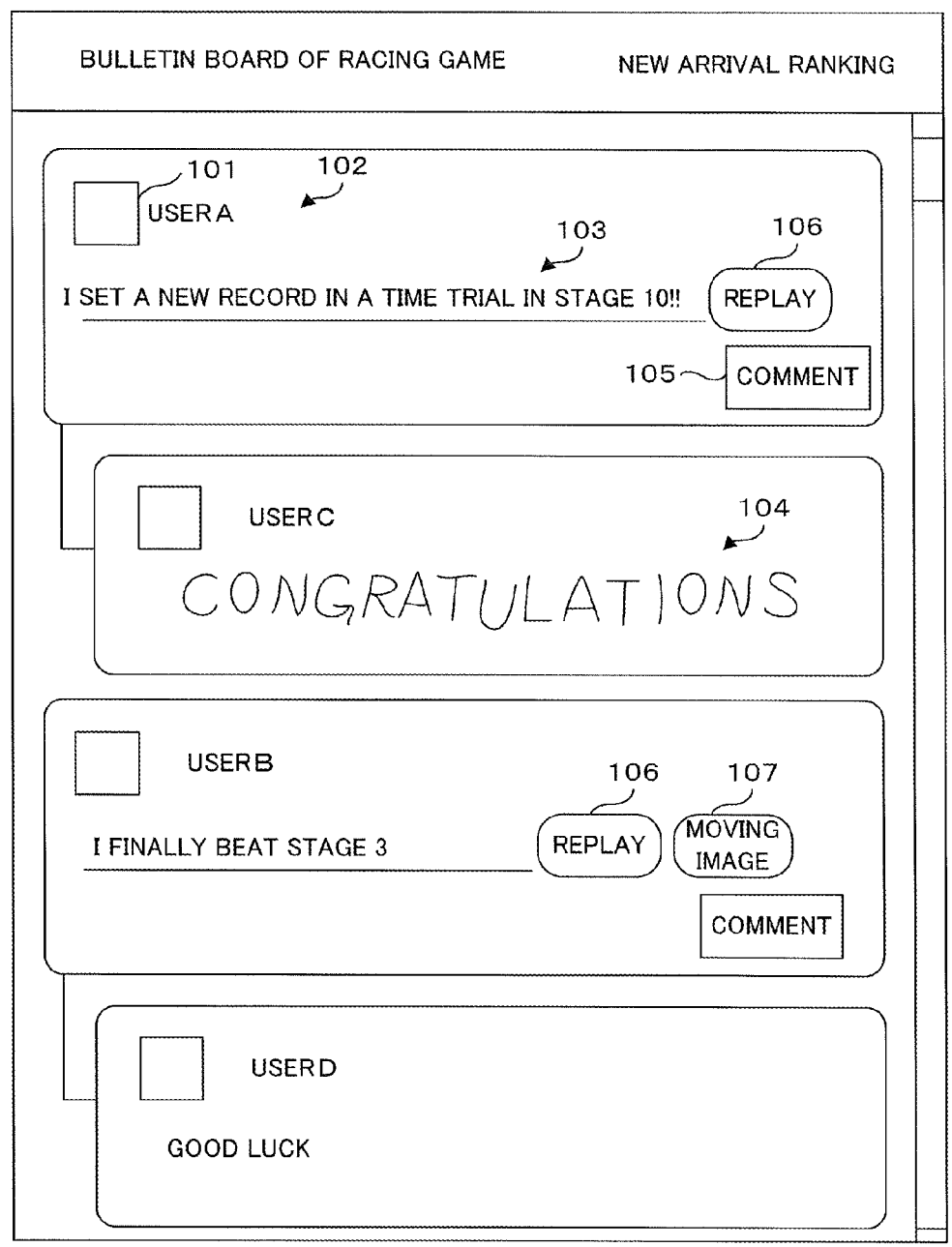
FIG. 11 shows an example non-limiting schematic view for illustrating a display example of a bulletin board.

FIG. 11 shows an example non-limiting schematic view for illustrating a display example of a bulletin board. In an illustrative display screen of a bulletin board, a letter string of "Bulletin Board of Racing Game" is displayed at an upper part of the screen as a title of the bulletin board. It is displayed on the bulletin board that comments are displayed according to new arrival ranking. A plurality of post comments are displayed in chronological order from the upper side to the lower side. The user can scroll the display up and down with a scroll bar. Each comment is displayed in a comment area having a substantially rectangular shape. Displayed in each comment area are a portrait image 101 and a user name 102 of a user who has posted the comment, and a text comment 103 or a hand-drawn image comment 104 which is a posted comment.

In the illustrative example, a text comment 103 of "I set a new record in a time trial in Stage 10!!" by a user A is displayed as the first post comment. In a comment area of a post comment, a comment posting button 105 to be used for posting a bulletin board comment for the comment is provided. One bulletin board comment is attached to the post comment. The bulletin board comment is displayed in a comment area having a substantially rectangle shape slightly smaller than the post comment. The bulletin board comment is connected with a corresponding post comment by a lead line. In the illustrative example, a hand-drawn image comment 104 of "Congratulations" by a user C is displayed as a bulletin board comment.

In the illustrative example, a text comment 103 of "I finally beat Stage 3." by a user B is displayed as the second post comment. Regarding a post comment, a moving image icon 107 is displayed in a comment area when posting of moving image data is performed in the process of posting of replay data. One bulletin board comment is attached to the second post comment. As the bulletin board comment, a text comment 103 of "Good luck." by a user D is displayed.

In the present embodiment, the text comment 103 or hand-drawn comment 104 displayed in a post comment on a bulletin board is provided with a function to accept operation of a replay request by the user. For example, when the operation unit 14 of the game machine 1 is constituted of a touch panel, the user can perform contact operation for a text comment 103 or a hand-drawn comment 104 of a post comment. This allows the user to cause the game machine 1 to initiate downloading of replay data relevant to the post comment. That is, the replay data requesting unit 25 of the game machine 1 accepts operation for a post comment on a displayed bulletin board. The replay data requesting unit 25 transmits a transmission request for replay data corresponding to a post comment, for which operation has been accepted, from the communication unit 15 to the posting server 3. When the posting server 3 receives the request from the game machine 1, the data transmitting unit 44 of the posting server 3 reads out replay data involved in the request from the replay data storage unit 31a of the storage unit 31 and transmits the replay data to the game machine 1. When a bulletin board is displayed at an information processing device other than the game machine 1, transmission of replay data is not performed.

In a post comment on a bulletin board, a replay icon 106 is displayed after the text comment 103 or the hand-drawn comment 104. The replay icon 106 is provided with a function to accept operation of a replay request by the user. The replay data requesting unit 25 of the game machine 1 gives a transmission request for replay data to the posting server 3 in response to operation at the replay icon 106. This is similar to a case where operation for a text comment 103 or a hand-drawn comment 104 has been performed. In the case of an information processing device other than the game machine 1, the replay icon 106 needs not to be displayed.

The moving image icon 107 displayed in a post comment on a bulletin board is provided with a function to accept operation by the user. The replay data requesting unit 25 of the game machine 1 accepts operation at the moving image icon 107 in the post comment on a bulletin board. When accepting operation at the moving image icon 107, the replay data requesting unit 25 transmits a transmission request for moving image data corresponding to the post comment from the communication unit 15 to the moving image server 5. When the moving image server 5 receives the request from the game machine 1, the data transmitting unit 62 of the moving image server 5 reads out moving image data involved in the request from the moving image data storage unit 51a of the storage unit 51 and transmits the moving image data to the game machine 1. Transmission of moving image data is performed even when a bulletin board is displayed at an information processing device other than the game machine 1.

The comment posting button 105 displayed in a post comment on a bulletin board is provided with a function to accept operation by the user. The comment processing unit 23 of the game machine 1 accepts operation at the comment posting button 105 on the bulletin board. When accepting operation at the posting button 105, the comment processing unit 23 displays an input screen of a bulletin board comment for the post comment at the display unit 13. The user can input a text or hand-drawn comment at the comment input screen. The comment processing unit 23 accepts input of a bulletin board comment and transmits the accepted comment to the posting server 3. When receiving the bulletin board comment from the game machine 1, the posting server 3 stores the bulletin board comment received by the post accepting unit 41 in the comment data storage unit 31b of the storage unit 31. The posting server 3 updates the comment management table. An information processing device other than the game machine 1 can also perform posting of a bulletin board comment.

Figure 12:
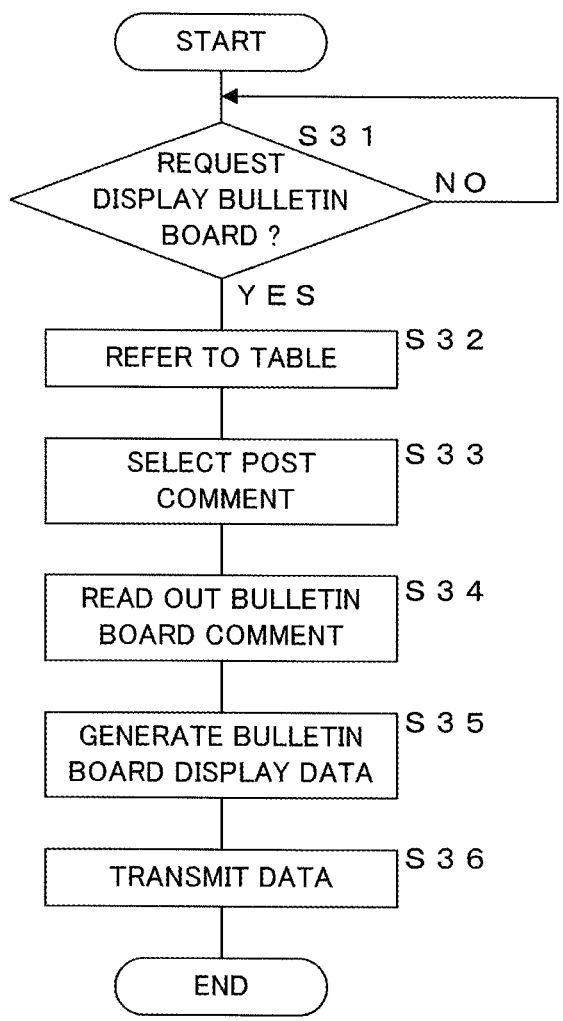
FIG. 12 shows an example non-limiting flowchart for illustrating the procedures in bulletin board display processing by a posting server.

FIG. 12 shows an example non-limiting flowchart for illustrating the procedures in bulletin board display processing by the posting server 3. The processing unit 30 of the posting server 3 judges whether a display request for a bulletin board from the game machine 1 or another information processing device has been received at the communication unit 33 or not (step S31). When a display request has not been received (S31: NO), the processing unit 30 waits until a display request is received. When a display request for a bulletin board has been received (S31: YES), the bulletin board data generating unit 42 of the processing unit 30 refers to the replay data management table and the comment management table stored in the storage unit 31 (step S32). The data generating unit 42 selects a post comment according to a condition, such as new arrival ranking or popularity ranking, on the basis of tables to which the data generating unit 42 has referred (step S33). The bulletin board data generating unit 42 reads out a bulletin board comment relevant to the selected post comment (step S34). The bulletin board data generating unit 42 generates bulletin board display data in which a post comment and a bulletin board comment are placed appropriately (step S35). The processing unit 30 transmits the bulletin board display data generated by the bulletin board data generating unit 42 to the game machine 1 or another information processing device involved in the display request (step S36) and terminates the processing.

Figure 13:
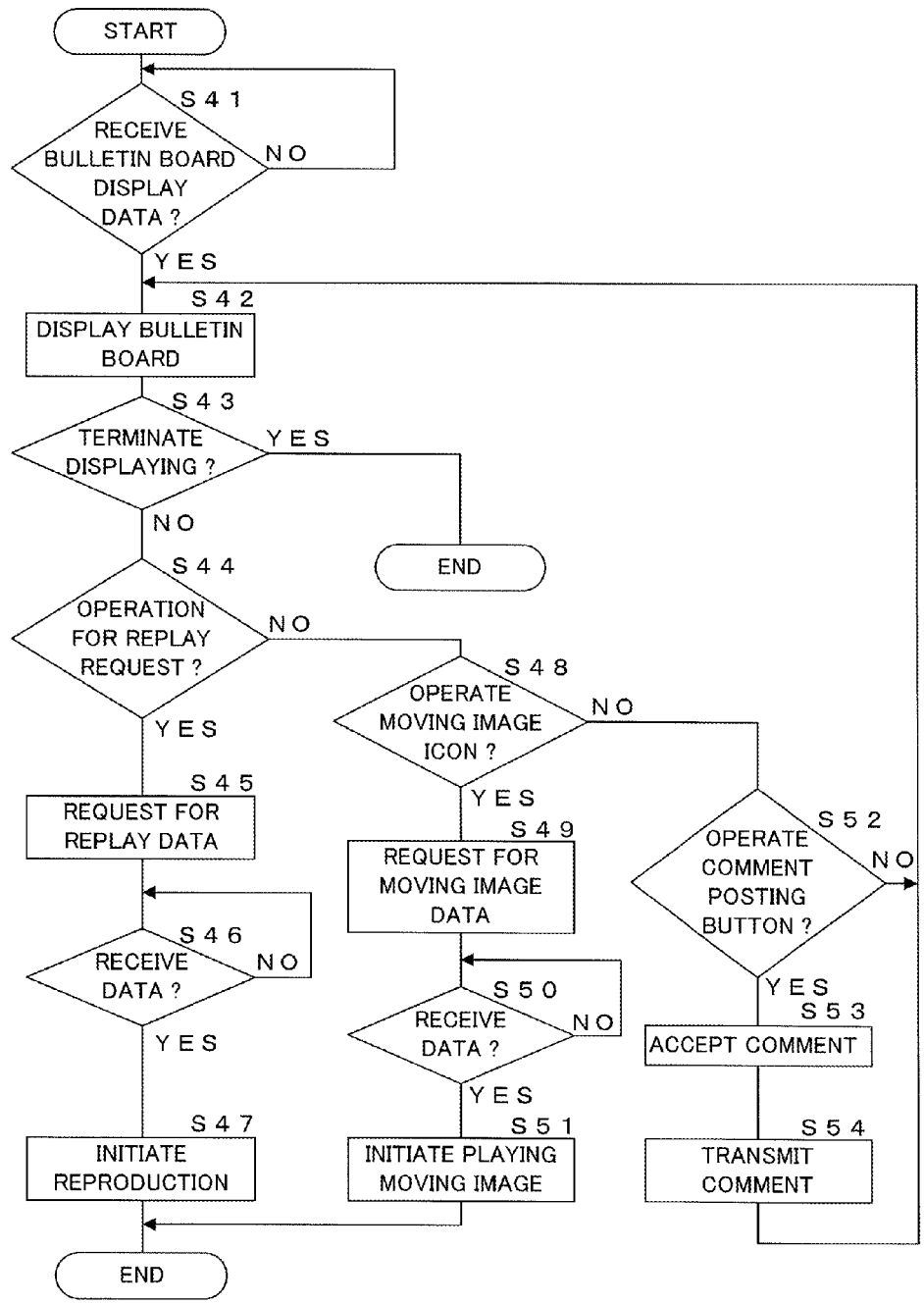
FIG. 13 shows an example non-limiting flowchart for illustrating the procedures in bulletin board display processing by a game machine.

FIG. 13 shows an example non-limiting flowchart for illustrating the procedures in bulletin board display processing by the game machine 1. The processing unit 10 of the game machine 1 judges whether bulletin board display data from the posting server 3 has been received at the communication unit 15 or not (step S41). When bulletin board display data has not been received (S41: NO), the processing unit 10 waits until data is received. When bulletin board display data has been received (S41: YES), the processing unit 10 performs, at the display processing unit 26, display processing of a bulletin board based on the bulletin board display data at the display unit 13 (step S42). The processing unit 10 judges whether operation to terminate displaying of a bulletin board has been performed or not (step S43). When termination operation has been performed (S43: YES), the processing unit 10 terminates display processing of a bulletin board.

When operation to terminate displaying of a bulletin board has not been performed (S43: NO), the processing unit 10 judges whether operation for a replay request has been performed or not (step S44). Operation for a replay request is to be performed at the text comment 103 or the hand-drawn image comment 104 of a post comment displayed on the bulletin board, or at the replay icon 106. When operation for a replay request at the comments or the replay icon 106 has been performed (S44: YES), the replay data requesting unit 25 of the processing unit 10 makes a transmission request for replay data corresponding to a post comment to be operated to the posting server 3 (step S45). The processing unit 10 judges whether replay data from the posting server 3 for the transmission request has been received or not (step S46). When replay data has not been received (S46: NO), the processing unit 10 waits until replay data is received. When replay data has been received (S46: YES), the processing unit 10 initiates reproduction of game play based on replay data received at the game processing unit 21 (step S47) and terminates the processing. An information processing device other than the game machine 1 may be constructed not to perform the processing in the steps S44 to S47 but to advance the processing to the step S48 when it is judged in the step S43 that operation for display termination has not been performed.

When operation for a replay request is not performed at the bulletin board (S44: NO), the processing unit 10 judges whether operation at the moving image icon 107 on the bulletin board has been performed or not (step S48). When operation at the moving image icon 107 has been performed (S48: YES), the replay data requesting unit 25 of the processing unit 10 makes a transmission request for moving image data, which corresponds to a post comment provided with the moving image icon 107 to be operated, to the moving image server 5 (step S49). The processing unit 10 judges whether moving image data for the transmission request from the moving image server 5 has been received or not (step S50). When moving image data has not been received (S50: NO), the processing unit 10 waits until moving image data is received. When moving image data has been received (S50: YES), the processing unit 10 initiates display processing of a moving image based on the received moving image data, i.e., play processing of a moving image (step S51) and terminates the processing.

When operation at the moving image icon 107 on the bulletin board has not been performed (S48: NO), the processing unit 10 judges whether operation at the comment posting button 105 on the bulletin board has been performed or not (step S52). When operation at the comment posting button 105 has been performed (S52: YES), the processing unit 10 displays a comment input screen at the display unit 13 and accepts input of a bulletin board comment (step S53). The processing unit 10 transmits the accepted bulletin board comment to the posting server 3 (step S54). The processing unit 10 returns the processing to the step S42 and continues displaying of a bulletin board. When operation at the comment posting button 105 has not been performed (S52: NO), the processing unit 10 returns the processing to the step S42 and continues displaying of a bulletin board.

Figure 14:
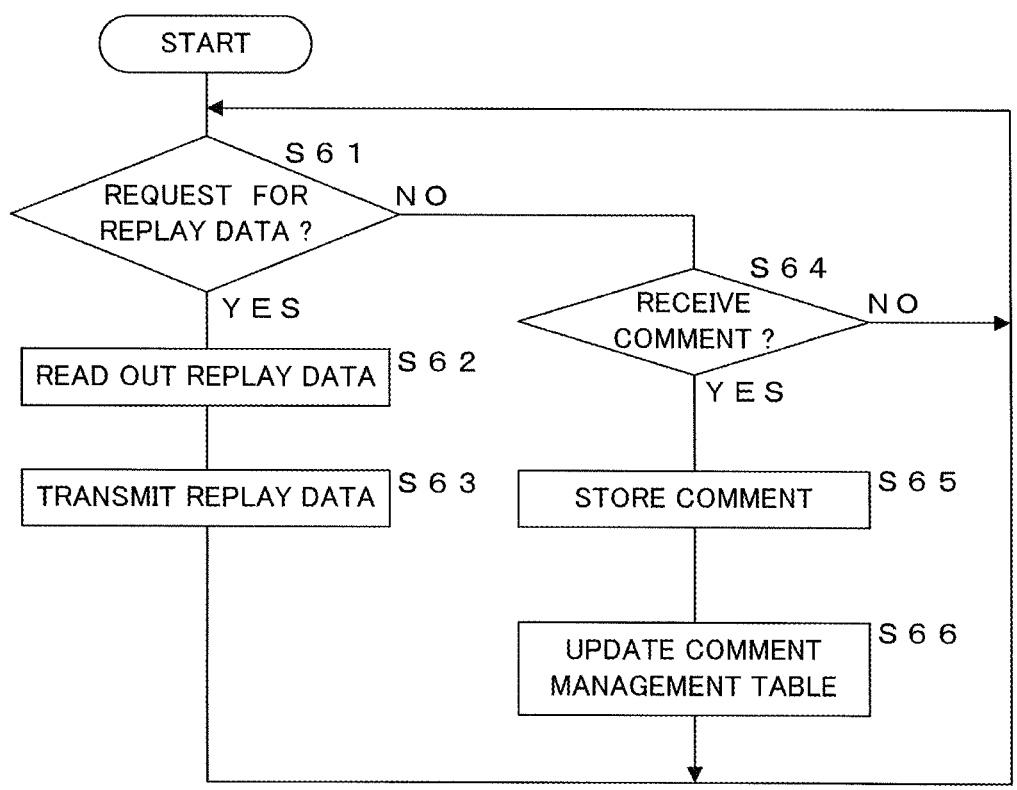
FIG. 14 shows an example non-limiting flowchart for illustrating the process procedures in transmittance of replay data and post acceptance of a bulletin board comment by a posting server.

FIG. 14 shows an example non-limiting flowchart for illustrating the process procedures in transmittance of replay data and post acceptance of a bulletin board comment by the posting server 3. The processing unit 30 of the posting server 3 judges whether a transmission request for replay data from the game machine 1 has been received at the communication unit 33 or not (step S61). When a transmission request has been received (S61: YES), the data transmitting unit 44 of the processing unit 30 reads out replay data involved in the transmission request from the replay data storage unit 31a of the storage unit 31 (step S62). The data transmitting unit 44 transmits the read-out replay data to the game machine 1 (step S63) and returns the processing to the step S61.

When a transmission request for replay data has not been received (S61: NO), the processing unit 30 judges whether a bulletin board comment from the game machine 1 or another information processing device has been received at the communication unit 33 or not (step S64). When a bulletin board comment has been received (S64: YES), the post accepting unit 41 of the processing unit 30 stores the received bulletin board comment in the comment data storage unit 31*b* of the storage unit 31 (step S65). The post accepting unit 41 updates the comment management table (step S66) and returns the processing to the step S61. When a bulletin board comment has not been received (S64: NO), the processing unit 30 returns the processing to the step S61.

<Replay List Display>

The second transmission method of replay data by the posting server 3 uses list display of replay data. The user of the game machine 1 can select an item of list display of replay data from a menu displayed at the display unit 13, for example. This allows the user to obtain list display of replay data at the display unit 13. Regarding the processing unit 10 of the game machine 1, the replay data requesting unit 25 gives a request for list display to the posting server 3 when an item of list display is selected. When the posting server 3 receives the request for list display, the replay list data generating unit 43 of the processing unit 30 in the posting server 3 selects some pieces of replay data from replay data, which is stored in the replay data storage unit 31*a* of the storage unit 31, using a condition such as new arrival ranking or popularity ranking. The replay list data generating unit 43 generates replay list display data obtained by assembling information concerning selected replay data, and transmits the replay list display data to the game machine 1 which has given the display request. Replay list display data to be generated by the replay list data generating unit 43 includes information such as thumbnail images of replay data and storage locations of replay data. The replay list data generating unit 43 refers to the replay data management table and generates replay list display data.

Figure 15:
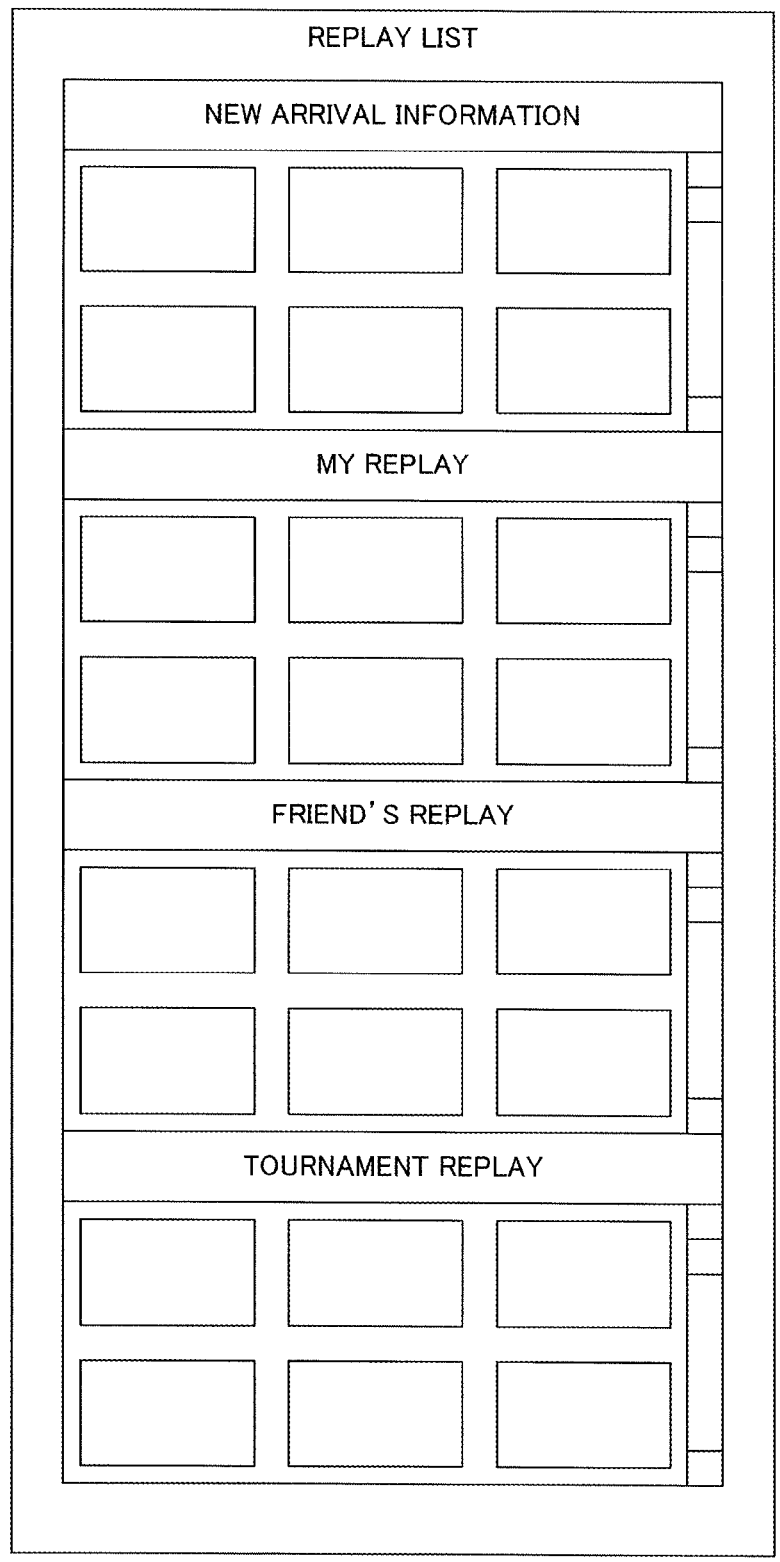
FIG. 15 shows an example non-limiting schematic view for illustrating a display example of a replay list.

FIG. 15 shows an example non-limiting schematic view for illustrating a display example of a replay list. In a display screen of the illustrative replay list, a title of "Replay List" is displayed at an upper part of the screen. The replay list is classified into a plurality of items such as "New Arrival Information," "My Replay," "Friend's Replay" and "Tournament Replay," for example. For each of the items, thumbnail images of relevant replay data are displayed in matrix arrangement. The arranged thumbnail images can be scrolled up and down with a scroll bar.

An item of "New Arrival Information" in the replay list is a list of replay data, which is selected by the posting server 3 from replay data stored in the storage unit 31 according to new arrival ranking. In the present embodiment, the posting server 3 can display thumbnail images concerning moving image data other than replay data, or more specifically a preview moving image of a new product, as new arrival information. Such moving image data may be stored in the storage unit 31 by the posting server 3. Moreover, such moving image data may be stored in the storage unit 51 by the moving image server 5, or may be stored by another server machine. An item of "My Replay" in the replay list is a list of replay data stored in the storage unit 11 of the game machine 1. For this reason, the game machine 1 displays a list regarding the item by referring not to data from the posting server 3 but to the storage unit 11 of the game machine 1 itself.

The item of "Friend's Replay" in the replay list is a list obtained by selecting replay data posted by another user, who has been registered by the posting server 3 as a friend, from the storage unit 31. For list display of the item, each user needs to preliminarily register a user ID of his/her friend or the like in the posting server 3 or another server machine, for example. It is also possible to preliminarily store a user ID of a friend or the like in the game machine 1, for example, and transmit the user ID of a friend or the like from the game machine 1 to the posting server 3 in the process of displaying of a replay list. The item of "Tournament Replay" in the replay list is a list obtained by selecting replay data of higher-ranking winners or the like of a tournament of a racing game according to the present embodiment, for example. The posting server 3 stores replay data concerning such a tournament in the storage unit 31 as data posted by a tournament administrator. Game replay concerning a tournament is not necessarily provided as replay data, but may be provided as moving image data. In such a case, moving image data concerning a tournament may be stored in the posting server 3. Moreover, moving image data concerning a tournament may also be stored in the moving image server 5 or in another server machine.

As described above, a replay list to be displayed at the display unit 13 of the game machine 1 can include not only a list based on replay data but also a list provided as moving image data. Moving image data may be stored in any one of the posting server 3, the moving image server 5 and another server machine. In the present embodiment, the moving image server 5 stores moving image data.

After displaying a replay list at the display unit 13, the user of the game machine 1 can perform operation for selecting any one from a plurality of displayed thumbnail images. This allows the user to initiate displaying of reproduction of a game at the game machine 1. When selection operation of a thumbnail image at a replay list is performed, the processing unit 10 of the game machine 1 judges whether the thumbnail image is replay data or moving image data. When a thumbnail image is replay data, the replay data requesting unit 25 of the processing unit 10 requests transmission of replay data involved in the selected thumbnail image to the posting server 3. When replay data involved in the selected thumbnail image has already been downloaded and stored in the storage unit 11, the processing unit 10 has only to read out corresponding replay data from the storage unit 11 without transmitting a request to the posting server 3. When replay data transmitted from the posting server 3 in response to a request is received at the communication unit 15, the processing unit 10 reproduces a game on the basis of the replay data at the game processing unit 21. At this time, the posting server 3 transmits a comment, which has been related to the replay data, to the game machine 1. The game machine 1 performs processing for displaying a comment together with a reproduced game.

When a thumbnail image is moving image data, the replay data requesting unit 25 of the processing unit 10 requests transmission of moving image data involved in the selected thumbnail image to the moving image server 5. When moving image data transmitted from the moving image server 5 in response to the request is received at the communication unit 15, the processing unit 10 plays moving image data at the display processing unit 26 and displays a moving image at the display unit 13.

Figure 16:
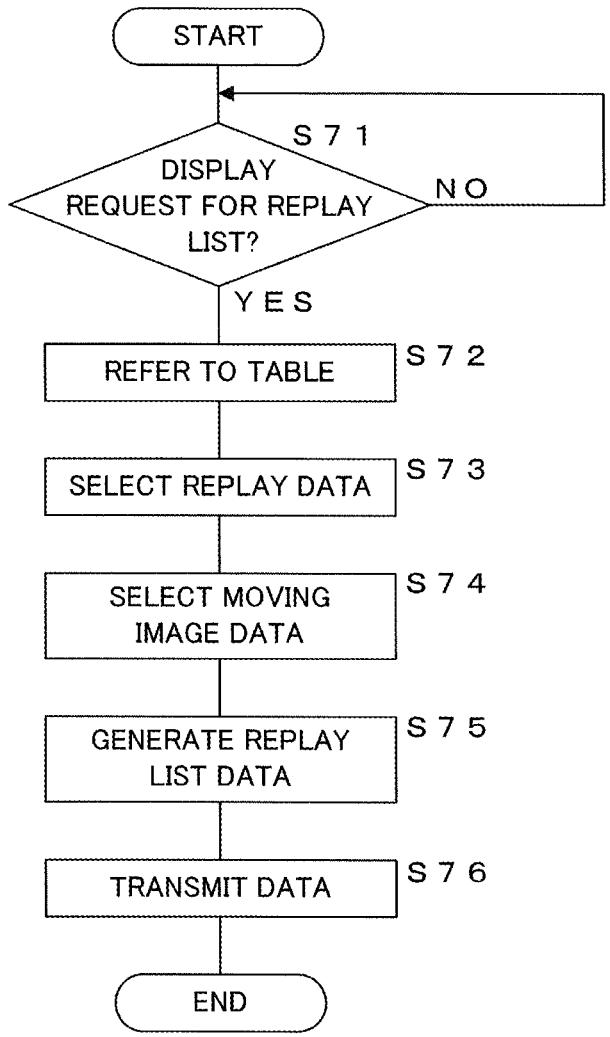
FIG. 16 shows an example non-limiting flowchart for illustrating the procedures in replay list transmittance processing by a posting server.

FIG. 16 shows an example non-limiting flowchart for illustrating the procedures in replay list transmittance processing by the posting server 3. The processing unit 30 of the posting server 3 judges whether a display request for a replay list from the game machine 1 has been received at the communication unit 33 or not (step S71). When a display request has not been received (S71: NO), the processing unit 30 waits until a display request is received. When a display request for a replay list has been received (S71: YES), the replay list data generating unit 43 of the processing unit 30 refers to the replay data management table (step S72). The replay list data generating unit 43 selects replay data to be displayed in a replay list, on the basis of the table to which the replay list data generating unit 43 has referred (step S73). The replay list data generating unit 43 selects moving image data to be displayed in a replay list from moving image data stored in the moving image server 5 (step S74). At this time, the replay list data generating unit 43 may perform processing for acquiring a list of moving image data or the like from the moving image server 5.

The replay list data generating unit 43 generates replay list data including a thumbnail image of replay data selected at the step S73, moving image data selected at the step S74 and the like (step S75). The replay list data generating unit 43 transmits the generated replay list data to the game machine 1 involved in the display request (step S76) and terminates the processing.

Figure 17:
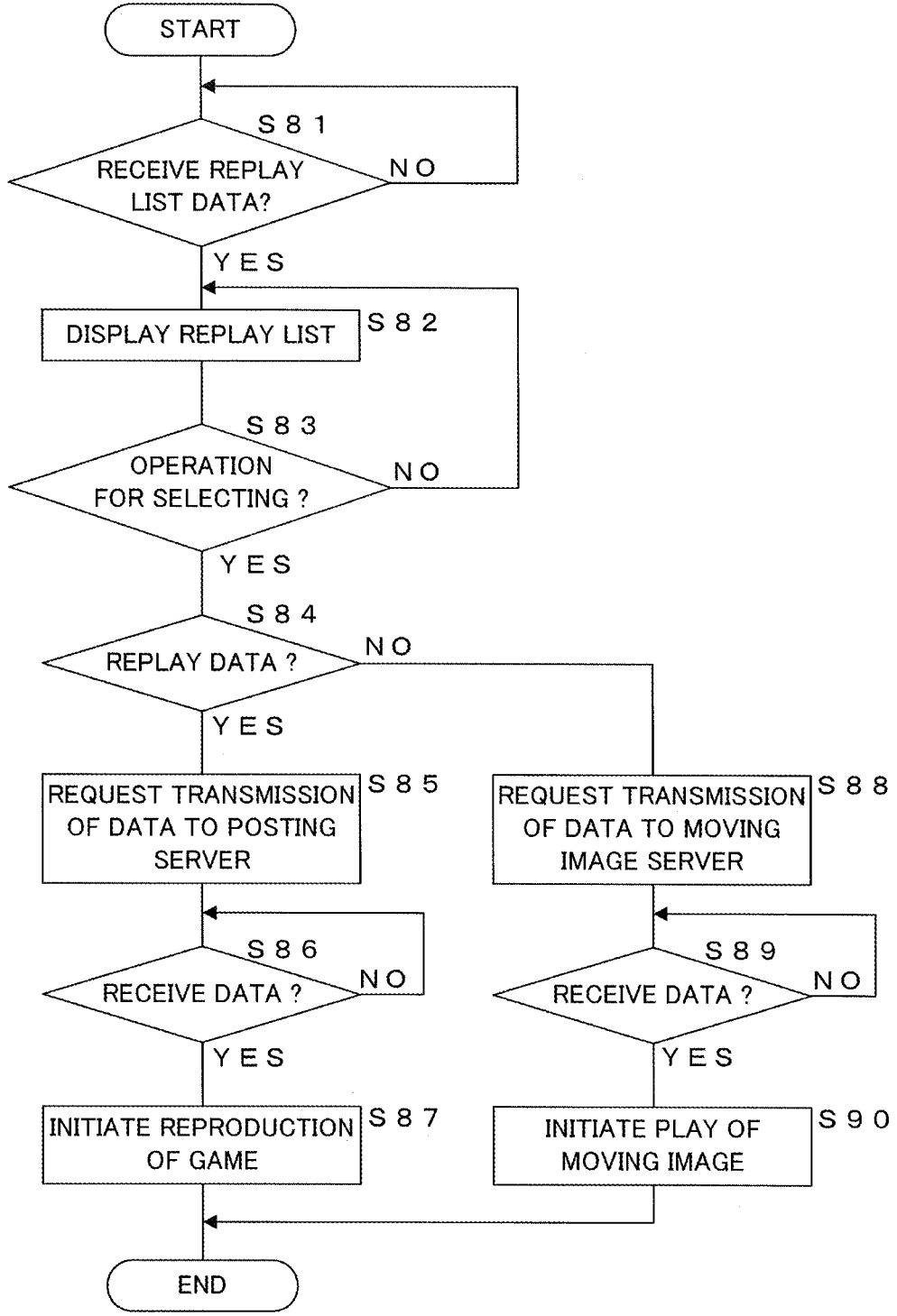
FIG. 17 shows an example non-limiting flowchart for illustrating the procedures in data acquisition processing at a replay list by a game machine.

FIG. 17 shows an example non-limiting flowchart for illustrating the procedures in data acquisition processing at a replay list by the game machine 1. The processing unit 10 of the game machine 1 judges whether replay list data from the posting server 3 has been received at the communication unit 15 or not (step S81). When replay list data has not been received (S81: NO), the processing unit 10 waits until replay list data is received. When replay list data has been received (S81: YES), the display processing unit 26 of the processing unit 10 displays a replay list at the display unit 13 on the basis of the received replay list data (step S82). The processing unit 10 judges whether operation for selecting any thumbnail image has been performed at the displayed replay list or not (step S83). When selection operation has not been performed (S83: NO), the processing unit 10 returns the processing to the step S82 and continues displaying of a replay list.

When selection operation has been performed (S83: YES), the replay data requesting unit 25 of the processing unit 10 judges whether the selected thumbnail image concerns replay data or not (step S84). When the selected thumbnail image concerns replay data (S84: YES), the replay data requesting unit 25 requests transmission of replay data involved in the selected thumbnail image to the posting server 3 (step S85). The processing unit 10 judges whether replay data transmitted from the posting server 3 in response to the request has been received at the communication unit 15 or not (step S86). When replay data has not been received (S86: NO), the processing unit 10 waits until replay data is received. When replay data has been received (S86: YES), the game processing unit 21 of the processing unit 10 initiates reproduction of game play based on the received replay data (step S87) and terminates the processing.

When the selected thumbnail image concerns moving image data (S84: NO), the replay data requesting unit 25 requests the moving image server 5 for transmission of moving image data involved in the selected thumbnail image (step S88). The processing unit 10 judges whether moving image data transmitted from the moving image server 5 in response to the request has been received at the communication unit 15 or not (step S89). When moving image data has not been received (S89: NO), the processing unit 10 waits until moving image data is received. When moving image data has been received (S89: YES), the display processing unit 26 of the processing unit 10 initiates play of received moving image data (step S90) and terminates the processing.

<Replay Display>

As described above, the game machine 1 can download intended replay data from the posting server 3 via a bulletin board or a replay list displayed at the display unit 13 and store the replay data in the storage unit 11. The game machine 1 can display reproduction of game play based on the replay data at the display unit 13. The posting server 3 transmits a post comment, a bulletin board comment and a browse comment, which have been related to the replay data, to the game machine 1 together with the replay data. The game machine 1 displays these comments together with reproduction of game play.

Figure 18:
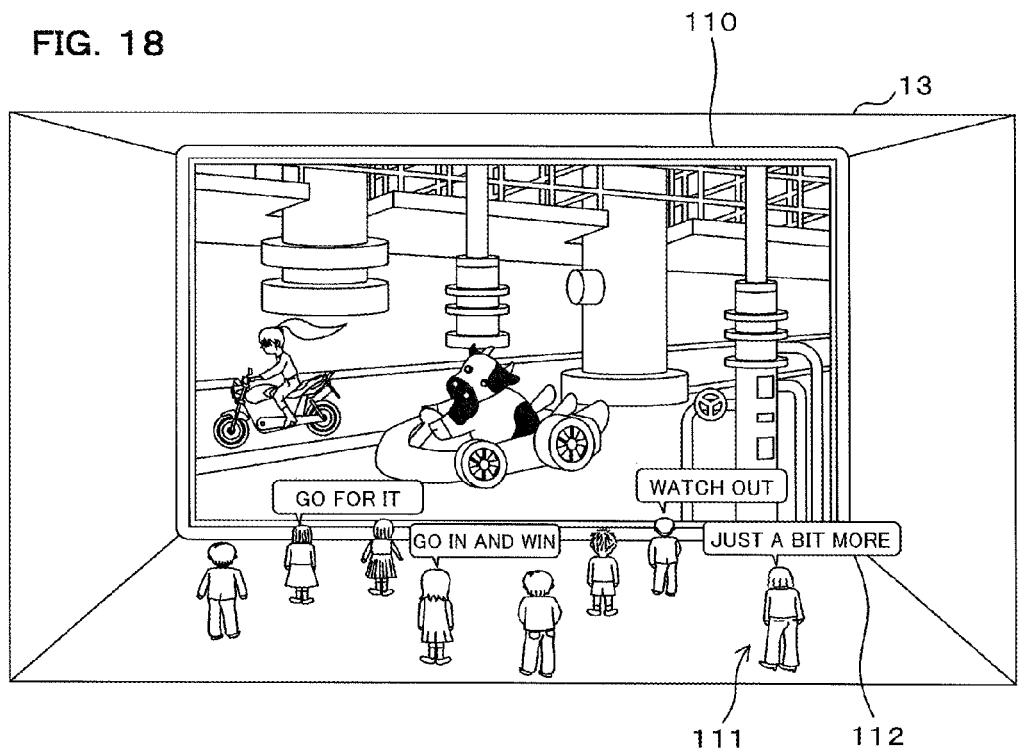
FIG. 18 shows an example non-limiting schematic view for illustrating a display example of a game reproduction screen by a game machine.

FIG. 18 shows an example non-limiting schematic view for illustrating a display example of a game reproduction screen by the game machine 1. In the present embodiment, the display processing unit 26 of the game machine 1 reproduces game play at a virtual television set 110 placed in a three-dimensional virtual space. In the three-dimensional virtual space, the display processing unit 26 places one or a plurality of character objects 111 in front of the virtual television set 110. The character objects 111 to be displayed by the display processing unit 26 are generated by the character processing unit 28 of the processing unit 10. Each character object 111 is placed to face the virtual television set 110 so as to represent a form watching reproduction of game play displayed at the virtual television set 110.

Each character object 111 is to be displayed as an alter ego of a user who has attached a comment to replay data. Each user preliminarily creates a character object 111 to be displayed as his alter ego and registers the character object 111 in the posting server 3 or another server machine. The posting server 3 attaches information, which is to be used for displaying a character object 111 to be displayed as an alter ego of a user who has posted the comment, to the comment and transmits the comment to the game machine 1. The information to be used for displaying is information such as the type, shape, color and texture of a character object 111, for example.

The display processing unit 26 of the game machine 1 displays a word balloon 112 near a character object with predetermined timing during moving image display of game reproduction. In the word balloon 112, a comment, which is involved in the character object 111 and has been posted by the user, is displayed. This represents that the character object 111 has issued the comment. A comment in the word balloon 112 may be any one of a post comment, a bulletin board comment and a browse comment. A comment in the word balloon 112 may be any one of a text comment and a hand-drawn comment. For example, the display processing unit 26 displays a word balloon 112 of a post comment with the earliest timing, or more specifically immediately after initiation of moving image display of game reproduction. For a browse comment, display timing is set as illustrated in the comment management table in FIG. 9. For this reason, the display processing unit 26 displays a word balloon 112 of a browse comment with set timing. The display processing unit 26 displays a word balloon 112 of a bulletin board comment at the time of or before/after termination of game reproduction. It is to be noted that the display timing of each comment is only an example and the present embodiment is not limited thereto.

The character processing unit 28 of the game machine 1 causes the character object 111 to take a predetermined action with predetermined timing during moving image display of game reproduction. For example, the character processing unit 28 causes all character objects 111 to take an action of raising hands with timing when the lead vehicle crosses the finish line in a reproduced game, with timing when reproduction of a game is terminated, or the like. This is an action of so-called "banzai".

The character processing unit 28 may cause a character object 111 to take a predetermined action in the process of issuance of a browse comment in a word balloon 112, for example. A predetermined action may be an action such as facing the front, raising hands, jumping, or performing a flip-flop, for example. In such a case, a user who posts a browse comment sets an action of a character object 111, which is to be taken in the process of issuance of a comment, at the time of comment posting. The posting server 3 preliminarily stores action setting of a character object 111 for a posted comment in the comment management table. The posting server 3 transmits the action setting of a character object 111 in the process of transmittance of a comment to the game machine 1 together with replay data.

Figure 19:
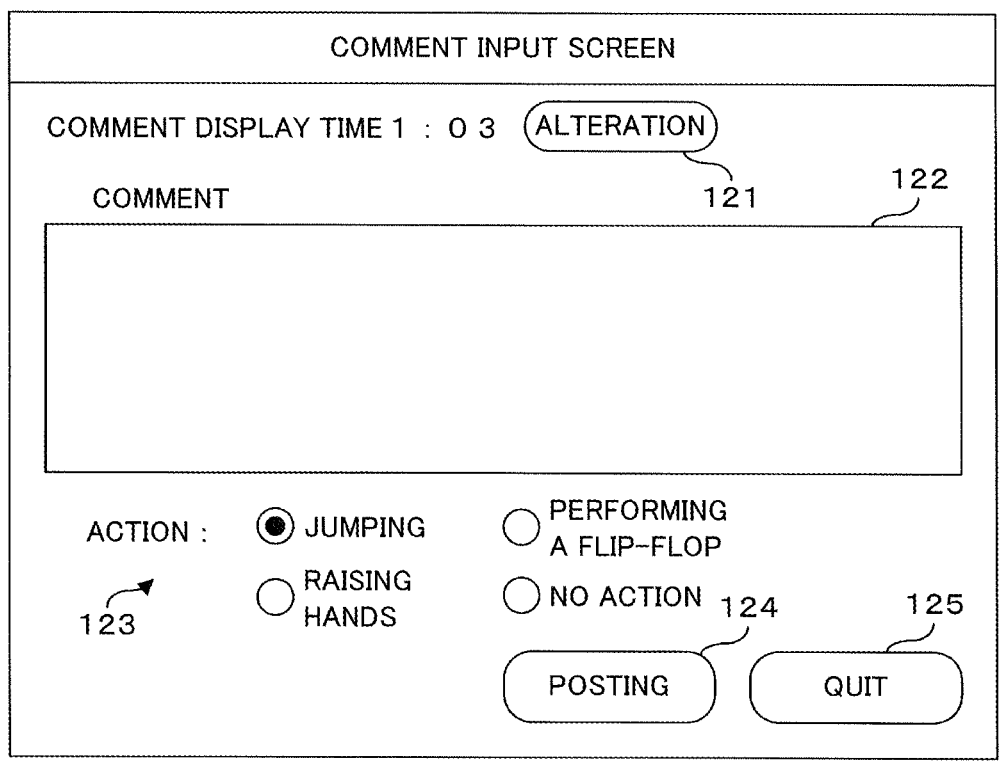
FIG. 19 shows an example non-limiting schematic view for illustrating a display example of an input screen of a browse comment.

The user of the game machine 1 can input a browse comment during moving image display of game reproduction. When predetermined operation is performed at the operation unit 14, for example, the processing unit of the game machine 1 suspends a moving image of game reproduction and displays an input screen of a browse comment at the display unit 13. FIG. 19 shows an example non-limiting schematic view for illustrating a display example of an input screen of a browse comment. In the illustrative screen, a comment display time is displayed below a title of "Comment Input Screen." The comment display time is a time to display a comment using a word balloon 112 of a character object 111 in reproduction time of a game. A time when game reproduction is suspended by the predetermined operation is set as an initial value of the comment display time. The user can display a setting screen (not illustrated) of a comment display time by operating an alteration button 121 and change the comment display time.

A box 122 in which a comment is to be written is provided below the comment display time. The user of the game machine 1 can input a text or hand-drawn comment in the box 122 using the operation unit 14. An action setting part 123 to be used for setting an action to be taken by a character object 111 in the process of displaying a comment is provided below the box 122. The user can select any one of "jumping," "raising hands," "performing a flip-flop" and "no action."

At the lowest part of the comment input screen, a posting button 124 and a quit button 125 are placed side by side. When operation at the posting button 124 is performed, the post processing unit 24 of the game machine 1 transmits information, such as an inputted comment, a comment display time and action setting of a character object 111, to the posting server 3. The post accepting unit 41 of the posting server 3 stores a comment posted from the game machine 1 and other information in the comment data storage unit 31b and updates the comment management table. When operation at the quit button 125 is performed, the game machine 1 terminates acceptance of comment input without posting an inputted comment. The game machine 1 deletes the comment input screen and restarts moving image display of suspended game reproduction in both of a case where the posting button 124 is operated and a case where the quit button 125 is operated.

The comment input screen may be provided with an item for setting the type, shape, color and the like of a character object 111 in the case of a user for whom a character object 111 to be displayed together with a post comment has not been registered. In such a case, inputted information such as the type of a character object 111 is transmitted to the posting server 3 and stored in the storage unit 31 together with the post comment.

Figure 20:
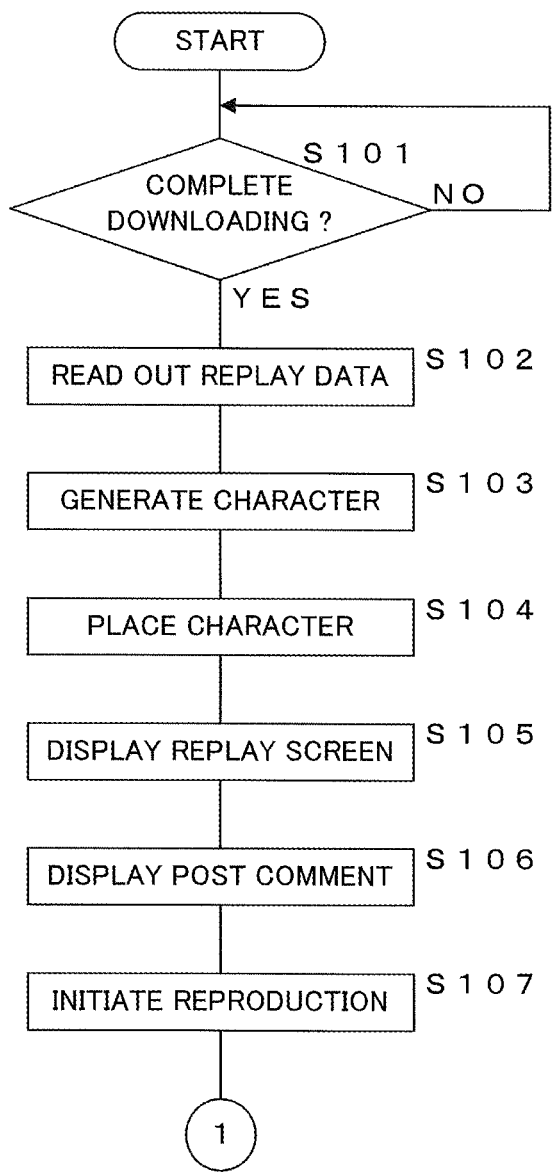
FIG. 20 shows an example non-limiting flowchart for illustrating the procedures in game reproduction processing to be performed by a game machine.

FIGS. 20 and 21 show an example non-limiting flowchart for illustrating the procedures in game reproduction processing to be performed by the game machine 1. It is to be noted that the flowchart illustrates the procedures to be executed after the game machine 1 requests the posting server 3 for transmission of replay data, and transmission of replay data from the posting server 3 to the game machine 1 is initiated. The processing unit 10 of the game machine 1 judges whether downloading of replay data from the posting server 3 has been completed or not (step S101). When downloading has not been completed (S101: NO), the processing unit 10 waits until downloading is completed.

When downloading of replay data has been completed (S101: YES), the processing unit 10 reads out the downloaded replay data from the storage unit 11 (step S102). The character processing unit 28 of the processing unit 10 generates one or a plurality of character objects 111 to be displayed, on the basis of character information of the user included in a comment received from the posting server 3 together with the replay data (step S103). The character processing unit 28 places the character objects 111 together with the virtual television set 110 in the three-dimensional virtual space (step S104). The display processing unit 26 of the processing unit 10 displays a replay screen illustrated in FIG. 18 at the display unit 13 on the basis of the three-dimensional virtual space in which the virtual television set 110 and the character objects 111 are placed (step S105).

The display processing unit 26 acquires a post comment from a comment received together with replay data. The display processing unit 26 displays a word balloon 112 near a character object 111 corresponding to the posting user and displays a post comment (step S106). The processing unit 10 initiates reproduction of a game based on the replay data at the game processing unit 21 (step S107) and initiates display of reproduction of a game at the virtual television set 110.

The processing unit 10 judges whether the game reproduction time has reached a time to display a browse comment or not (step S108). When the game reproduction time has reached a time to display a browse comment (S108: YES), the character processing unit 28 of the processing unit 10 causes a character object 111 of a user who has posted a browse comment to be displayed to take a set action (step S109). The display processing unit 26 displays a word balloon 112 near the character object 111, displays a browse comment (step S110) and returns the processing to the step S108.

When the game reproduction time has not reached a time to display a browse comment (S108: NO), the processing unit 10 judges whether operation for comment input has been performed or not (step S111). When operation for comment input has been performed (S111: YES), the processing unit 10 suspends reproduction of a game (step S112). The display processing unit 26 displays a comment input screen at the display unit 13 (step S113). The processing unit 10 judges whether operation at the posting button 124 in the comment input screen has been performed or not (step S114). When operation at the posting button 124 has not been performed (S114: NO), the processing unit 10 returns the processing to the step S113 and continues displaying of a comment input screen. When operation at the posting button 124 has been performed (S114: YES), the post processing unit 24 of the processing unit 10 transmits an inputted comment and other information from the communication unit 15 to the posting server 3 (step S115). The processing unit 10 restarts reproduction of a game (step S116) and returns the processing to the step S108. It is to be noted that processing to be executed when operation at the quit button 125 in the comment input screen is performed is omitted in the flowchart.

When operation for comment input has not been performed (S111: NO), the processing unit 10 judges whether predetermined timing has been reached in a reproduced racing game or not (step S117). The predetermined timing is timing when a vehicle reaches a goal or timing when reproduction of a game by replay data is terminated, for example. When the predetermined timing has not been reached (S117: NO), the processing unit 10 returns the processing to the step S108. When the predetermined timing has been reached (S117: YES), the character processing unit 28 of the processing unit 10 causes a displayed character object 111 to take an action of "banzai" to raise hands (step S118). The display processing unit 26 of the processing unit 10 displays a word balloon 112 near a character object 111 of a user who has posted a bulletin board comment, displays the bulletin board comment (step S119) and terminates game reproduction processing.

<Replay Editing & Posting>

In the present embodiment, the user of the game machine 1 can edit replay data downloaded from the posting server 3. Acceptance of edit operation by the user, edit processing of replay data corresponding to accepted operation and the like are performed by the edit processing unit 27 of the processing unit 10 of the game machine 1. The edit processing unit 27 can perform processing such as changing of a viewpoint of replay data and generation of highlight data, for example. The edit processing unit 27 may be constructed to perform editing by, for example, extracting goal scenes or the like in a plurality of pieces of replay data and compiling the goal scenes into one piece of replay data. The edit processing unit 27 may perform processing for generating a plurality of pieces of replay data, which respectively have different viewpoints, from one piece of replay data, for example. Moreover, the user can post edited replay data to the posting server 3. Since posting of edited replay data can be achieved by the same procedures as those of posting of normal replay data, detailed explanation will be omitted.

CONCLUSION

An information processing system according to an embodiment having the above configuration is provided with a plurality of game machines 1, the posting server 3 and the moving image server 5. Regarding the game machine 1, the replay data generating unit 22 generates replay data to be used for reproducing game play processed by the game processing unit 21. The game machine 1 accepts, at the comment processing unit 23, input of a comment concerning replay data. The game machine 1 posts, at the post processing unit 24, replay data and a comment to the posting server 3. Regarding the posting server 3, the post accepting unit 41 accepts the replay data and the comment posted from the game machine 1. The posting server 3 stores the accepted replay data and comment in the storage unit 31 in association with each other. Regarding the posting server 3, the bulletin board data generating unit 42 generates bulletin board data to be used for displaying the comment stored in the storage unit 31. Regarding the posting server 3, the data transmitting unit 44 transmits the generated bulletin board data.

Regarding the game machine 1, the display processing unit 26 displays a bulletin board at the display unit 13 on the basis of the bulletin board data transmitted by the posting server 3. When the game machine 1 accepts operation for a post comment displayed on the bulletin board, the replay data requesting unit 25 transmits an acquisition request for replay data corresponding to the post comment to the posting server 3. Regarding the posting server 3, the data transmitting unit 44 reads out replay data from the storage unit 31 in response to the request from the game machine 1 and transmits the replay data to the game machine 1.

These allow the user to easily post and acquire replay data with the game machine 1 and therefore enhancement of the convenience in utilization of an information processing system by the user can be expected.

Regarding the game machine 1, the replay data generating unit 22 generates highlight data from full replay data by reducing a reproduction time. The game machine 1 generates highlight data and posts the highlight data to the posting server 3 when the number of players of a game exceeds a predetermined value. The game machine 1 posts full highlight data to the posting server 3 when the number of players of a game does not exceed the predetermined value. This enables reduction of the data size of replay data.

Regarding the game machine 1, the replay data generating unit 22 can generate moving image data from replay data. The post processing unit 24 can post moving image data to the moving image server 5. The posting server 3 stores an address of a moving image data storage location, which is to be used for playing moving image data stored in the moving image server 5, in a replay data management table. For display of a bulletin board based on bulletin board data generated by the bulletin board data generating unit 42 of the posting server 3, the moving image icon 107 is displayed when moving image data corresponding to the replay data exists. Bulletin board data includes information to be used for playing the moving image data, such as an address of a moving image data storage location. When accepting operation at the moving image icon 107, the game machine 1 requests transmission of moving image data to the moving image server 5 on the basis of the information. The moving image server 5 transmits moving image data in response to the request from the game machine 1. This allows the information processing system to transmit data of different formats.

The replay list data generating unit 43 of the posting server 3 selects some pieces of data from posted replay data or moving image data and generates replay list data to be used for providing list display of the selected data. The data transmitting unit 44 transmits the generated replay list data to the game machine 1. Regarding the game machine 1, the display processing unit 26 displays a replay list at the display unit 13 on the basis of the replay list data. The replay list includes list display of replay data and moving image data in a mixed manner. This allows the user to easily acquire the replay data and the moving image data with the game machine 1 and therefore enhancement of the convenience in utilization of an information processing system by the user can be expected.

Regarding the game machine 1, the game processing unit 21 reproduces game play on the basis of the replay data. Regarding the game machine 1, the comment processing unit 23 can accept input of a browse comment during reproduction of game play, and the post processing unit 24 can post the browse comment to the posting server 3. The post accepting unit 41 of the posting server 3 accepts posting of the browse comment and stores the browse comment in association with original replay data and a post comment. This allows the user to easily post a comment while browsing reproduced game play.

Regarding the game machine 1, the comment processing unit 23 accepts input of a bulletin board comment for a post comment displayed on a bulletin board. The post processing unit 24 posts the accepted bulletin board comment to the posting server 3. The post accepting unit 41 of the posting server 3 accepts posting of a bulletin board comment from the game machine 1 and stores the bulletin board comment in association with original replay data and a post comment. This allows the user to easily post a comment for a comment by a posting user who has posted replay data.

Regarding an information processing system according to the present embodiment, the data transmitting unit 44 of the posting server 3 transmits replay data and a comment, which has been associated with the replay data, in response to a request from the game machine 1. When receiving the replay data and the comment, the game machine 1 reproduces game play on the basis of the replay data. The game machine 1 displays a comment during reproduction of a game based on replay data. The game machine 1 is constructed to accept both of a text comment and a hand-drawn image comment. These allow the user to further enjoy watching reproduced game play.

The post processing unit 24 of the game machine 1 posts an input time of a browse comment in reproduction time of a game to the posting server 3 as display timing of the comment. The posting server 3 stores information of display timing in association with a browse comment in the comment management table. In the process of transmittance of a browse comment to the game machine 1, the posting server 3 transmits the information of display timing together with the browse comment. The display processing unit 26 of the game machine 1 displays the browse comment with the display timing received from the posting server 3 in the process of reproduction of game play. This enables display of a browse comment at a suitable part of a reproduced game.

The game machine 1 accepts edit operation for replay data downloaded from the posting server 3 and the edit processing unit 27 performs edit processing for the replay data. Edited replay data can be posted from the game machine 1 to the posting server 3 as in the case with replay data created by the game machine 1. The post accepting unit 41 of the posting server 3 stores the edited replay data posted from the game machine 1 in the replay data storage unit 31a of the storage unit 31 as in the case with other replay data, and updates the replay data management table. Editing of replay data can include changing of a viewpoint position in the process of reproduction of game play, for example. This allows the user to edit replay data created by another user and posts the replay data to the posting server 3.

In the process of displaying of a moving image obtained by reproducing game play, the character processing unit 28 of the game machine 1 displays one or a plurality of character objects 111. The character processing unit 28 causes a character object 111 to take a predetermined action with reproduction of game play. For example, the game machine 1 displays a word balloon 112, which has a comment written therein, near the character object 111 and causes the character object 111 to take an action of issuing the comment. These allow the user to further enjoy watching reproduced game play.

In the process of input acceptance of a browse comment, the game machine 1 accepts action setting which is setting of an action to be taken by the character object 111. The game machine 1 accepts an action of issuing a comment and display time setting to take the set action of the character object 111. The posting server 3 preliminarily stores the setting information in association with a browse comment, and transmits the setting information together in the process of transmittance of a browse comment to the game machine 1. In the process of displaying of a browse comment, the game machine 1 causes the character object 111 to take the set action at the set display time. In the process of input acceptance of a browse comment, the game machine 1 may accept setting of the type, shape or the like of a character object 111 to be used for comment display. These allow the user to specify the way of displaying a browse comment.

For a post comment and a bulletin board comment which do not include information such as a display time, the game machine 1 causes comment display of a word balloon 112 of a character object 111 at a predetermined time point in reproduction time of game play. The predetermined time point can be, for example, a reproduction initiation time or a fight finishing time of a game. The game machine 1 causes a character object 111 to take a predetermined action such as "banzai," for example, at a predetermined time point such as when the finish line is crossed in a racing game, for example. These allow the user to further enjoy watching reproduced game play.

It is to be noted that the present embodiment is not limited to the above structure wherein the game machine 1 can post moving image data together with replay data. For example, the present embodiment may have a structure wherein posting of moving image data from the game machine 1 to the moving image server 5 is not performed. The present embodiment is not limited to the above structure wherein the posting server 3 stores replay data and a comment together in the storage unit 31. For example, replay data and a comment may be stored in different server machines. The game machine 1 may be constructed to attach a comment such as a post comment, a bulletin board comment or a browse comment to moving image data to be posted to the moving image server 5 as in the case with replay data. The present embodiment is not limited to the above structure wherein the posting server 3 accepts a request for replay data from the game machine 1 via a bulletin board and a replay list. The posting server 3 may be constructed to accept a request for replay data using only one of a bulletin board and a replay list. The posting server 3 may also be constructed to accept a request by a method other than a bulletin board and a replay list.

The present embodiment is not limited to the above example of process procedures of the game machine 1, the posting server 3 and the moving image server 5. The present embodiment is not limited to the above example of structures of a replay data management table illustrated in FIG. 8 and a comment management table illustrated in FIG. 9. The present embodiment is not limited to the above example of structures of a bulletin board illustrated in FIG. 11, a replay list illustrated in FIG. 15, a replay screen illustrated in FIG. 18, and a comment input screen illustrated in FIG. 19.

The present embodiment is not limited to the above-described example wherein the game machine 1 is used as an information processing device. For example, a similar technology can be applied to various kinds of information processing devices such as a general-purpose computer, a tablet terminal device or a mobile telephone. The present embodiment is not limited to the device configuration of an information processing system and function division between devices described above. For example, at least a part of functions which have been described to belong to the game machine 1 may belong to the posting server 3 or the moving image server 5 in the present embodiment. On the contrary, at least a part of functions which have been described to belong to the posting server 3 or the moving image server 5 may belong to the game machine 1. Functions of the posting server 3 or the moving image server 5 may be realized not by one server machine but by a plurality of server machines.

When used in the present specification, each element or the like denoted in a singular form with a word "a" or "an" attached in front thereof is to be understood not to eliminate the possibility of a plurality of elements related thereto.

With an information processing system according to the present embodiment, enhancement of the convenience in utilization of the system by the user can be expected with respect to posting of data involved in a game, acquisition of transmitted data and the like.

What is claimed is:

1. An information processing system comprising a plurality of information processing devices and a server machine, wherein
    each information processing device includes an operation unit and a computer system comprising at least one processor, the computer system being at least configured to:
        execute a game application to perform processing involved in a game;
        during execution of the game application, receive, from the operation unit, input data for controlling operations in the game;
        during execution of the game application, generate reproduction data to be used for reproducing game play processed during the game;
        accept input of relevant information for the generated reproduction data; and
        transmit the generated reproduction data and the accepted relevant information to the server machine; and
    the server machine includes at least one processor, the server machine being at least configured to:
        receive the generated reproduction data and the accepted relevant information transmitted from the information processing device;
        receive, from one or more other information processing devices, additional relevant information;
        store, in storage associated with the server machine, the received reproduction data, the received relevant information, and the received additional relevant information in association with each other; and
        transmit the stored relevant information in association with the stored reproduction data to a plurality of other information processing devices; and
    the computer system of the information processing device being further configured to:
        receive, from the server machine, the additional relevant information received from the one or more other information processing devices; and
        display, on a display associated with the information processing device, the accepted relevant information and the additional relevant information received from the server machine.

2. The information processing system according to claim 1, wherein
    the computer system of at least one information processing device is further configured to accept operation for the additional relevant information displayed by the display and perform predetermined processing concerning the displayed additional relevant information in response to the accepted operation.

3. The information processing system according to claim 2, wherein
    the computer system of at least one information processing device is further configured to transmit an acquisition request of reproduction data corresponding to the displayed relevant information, for which operation has been accepted, to the server machine as the predetermined processing.

4. The information processing system according to claim 3, wherein
    the server machine is further configured to transmit reproduction data, which corresponds to relevant information involved in an acquisition request from the information processing device, to the information processing device in response to the acquisition request, and
    the computer system of the information processing device providing the acquisition request is further configured to receive reproduction data transmitted by the server machine and reproduce game play on the basis of the received reproduction data.

5. The information processing system according to claim 1, wherein
    the computer system of each of the information processing devices is further configured to:
        generate moving image data obtained by reproducing the game play from the reproduction data, and
        transmit the generated moving image data together with the reproduction data and the relevant information.

6. The information processing system according to claim 5, further comprising:
    a second server machine includes at least one processor, the second server machine being at least configured to:
    receive moving image data transmitted from at least one of the information processing devices;
    store, in second storage associated with the second server machine, the received moving image data,
    wherein the storage of the server machine stores information for playing, which is associated with moving image data stored in the second storage of the second server machine, together with reproduction data and relevant information corresponding to the moving image data,
    the server machine transmits the information for playing together with the relevant information, and
    the display is provided on the display based on the additional relevant information and the information for playing.

7. The information processing system according to claim 6, wherein the computer system of each of the information processing devices is further configured to accept operation for the information for playing and perform second predetermined processing concerning the information for playing in response to accepted operation.

8. The information processing system according to claim 7, wherein the computer system of each of the information processing devices is further configured to request transmittance of moving image data to the second server machine as the second predetermined processing on the basis of the information for playing when the operation for the information for playing is accepted.

9. The information processing system according to claim 8, wherein
    the second server machine is further configured to transmit moving image data involved in a transmittance request from the information processing device to the information processing device in response to the transmittance request, and the computer system of the information processing device providing the transmittance request is further configured to receive moving image data transmitted by the second server machine and perform processing for displaying a moving image on the basis of the received moving image data.

10. The information processing system according to claim 6, wherein the server machine is further configured to:

select one or a plurality of pieces of data from reproduction data stored in the storage of the server machine or moving image data stored in the second storage of the second server machine; and transmit display data to be used for displaying the selected pieces of data to at least one information processing device, and wherein the processing system of the information processing device receiving the display data is further configured to provide display involved in selected reproduction data or moving image data on the basis of the display data from the server machine.

11. The information processing system according to claim 10, wherein the reproduction data and moving image data is displayed in a mixed manner.

12. The information processing system according to claim 1, wherein the computer system of each of the information processing devices is further configured to generate compacted reproduction data, which has a reduced reproduction time, from generated reproduction data, and the generated compacted reproduction data and relevant information are transmitted to the server machine.

13. The information processing system according to claim 12, wherein the game is a game which can be played by one or a plurality of users, and the compacted reproduction data, which has a reduced reproduction time, is generated depending on the number of players of the game.

14. The information processing system according to claim 13, wherein the compacted reproduction data, which has a reduced reproduction time, is generated when the number of players of the game exceeds a predetermined value, and the generated compacted reproduction data and the relevant information are transmitted to the server machine when the number of players of the game exceeds the predetermined value, and transmits generated reproduction data and relevant information to the server machine when the number of players of the game does not exceed the predetermined value.

15. The information processing system according to claim 1, wherein the relevant information is a comment concerning the reproduction data.

16. The information processing system according to claim 1, wherein the game play is reproduced on the basis of reproduction data received from the server machine, the computer system of the information processing devices is further configured to:

accept input of a comment during reproduction of game play, and transmit the accepted comment to the server machine, the server machine is configured to receive comments from the plurality of information processing devices, and store the received comments in association with reproduction data and relevant information.

17. The information processing system according to claim 1, wherein the computer system of the information processing devices is further configured to:

accept input of a comment for relevant information displayed on the display; and transmit the accepted comment to the server machine, the server machine is configured to receive comments from the plurality of information processing devices, and store the received comments in association with reproduction data and relevant information.

18. An information processing device including an operation unit and a computer system comprising at least one processor, the computer system being at least configured to:

execute a game application to perform processing involved in a game;

during execution of the game application, receive, from the operation unit, input data for controlling operations in the game;

during execution of the game application, generate reproduction data to be used for reproducing game play processed during the game;

accept input of relevant information for the generated reproduction data;

transmit, to a server for distribution to a plurality of other devices, the generated reproduction data and the accepted relevant information;

receive additional relevant information transmitted from at least one of the plurality of other devices; and display, on a display associated with the information processing device, the accepted relevant information and the received additional relevant information.

19. A server machine includes a computer system comprising at least one processor, the computer system being at least configured to:

receive, from an information processing device, reproduction data to be used for reproducing game play performed during execution of a game application on the information processing device in accordance with user operations received by an operation unit and relevant information input at the information processing device and which is relevant to the reproduction data;

receive, from one or more other information processing devices, additional relevant information input at the one or more other information processing devices and which is relevant to the reproduction data;

store, in storage associated with the server machine, the received reproduction data, the received relevant information, and the received additional relevant information in association with each other;

transmit the relevant information and the additional relevant information stored in association with the stored reproduction data to a plurality of other information processing devices; and in response to a request from one or more other information processing devices, transmit, to the one or more other information processing devices, the stored reproduction data.

20. A non-transitory recording medium recording an information processing program for execution by an information processing device including an operation unit, the information processing program, when executed, causing the information processing device to:
- execute a game application to perform processing involved in a game;
- during execution of the game application, receive, from the operation unit, input data for controlling operations in the game;
- during execution of the game application, generate reproduction data to be used for reproducing game play processed during the game;
- accept input of relevant information for the generated reproduction data;
- transmit, to a server for distribution to a plurality of other devices, the generated reproduction data and the accepted relevant information;
- receive additional relevant information transmitted from at least one of the plurality of other devices; and
- display, on a display associated with the information processing device, the accepted relevant information and the received additional relevant information.

21. A non-transitory recording medium recording a server program for execution by a server machine, the server program, when executed, causing the server machine to:
- receive, from an information processing device, reproduction data to be used for reproducing game play performed during execution of a game application on the information processing in accordance with user operations received by an operation unit and relevant information input at the information processing device and which is relevant to the reproduction data;
- receive, from one or more other information processing devices, additional relevant information input at the one or more other information processing devices and which is relevant to the reproduction data;
- store, in storage associated with the server machine, the received reproduction data, the received relevant information, and the received additional relevant information in association with each other; and
- transmit the relevant information and the additional relevant information stored in association with the stored reproduction data to a plurality of other information processing devices; and
- in response to a request from one or more other information processing devices, transmit, to the one or more other information processing devices, the stored reproduction data.

22. An information processing method comprising:
- execute a game application to perform processing involved in a game;
- during execution of the game application, receive, from an operation unit of an information processing device, input data for controlling operations in the game;
- during execution of the game application, generating, at the information processing device, reproduction data to be used for reproducing game play;
- accepting, at the information processing device, input of relevant information or the generated reproduction data;
- transmitting, at the information processing device, the generated reproduction data and the accepted relevant information to a server machine for distribution to a plurality of other devices;
- receiving, at the server machine, the reproduction data and the relevant information transmitted from the information processing device;
- receiving, at the server machine, additional relevant information input at the one or more other information processing devices and which is relevant to the reproduction data;
- storing, at the server machine, the received reproduction data, the received relevant information, and the received additional relevant information in association with each other;
- transmitting, at the server machine, the stored relevant information and the additional relevant information in association with the stored reproduction data to a plurality of other information processing devices;
- in response to a request from one or more other information processing devices, transmitting the stored reproduction data to the one or more other information processing devices; and
- displaying, on a display at the information processing device, additional relevant information transmitted from the server machine.

23. The information processing system according to claim 1, wherein the input for the relevant information is accepted after the reproduction data is generated.

24. The information processing device according to claim 18, wherein the input for the relevant information is accepted after the reproduction data is generated.

25. The non-transitory recording medium according to claim 20, wherein the input for the relevant information is accepted after the reproduction data is generated.

26. The server machine according to claim 19, wherein the computer system is further configured to:
- transmit the additional relevant information stored in association with the stored reproduction data to the information processing device.

27. The information processing method according to claim 22, wherein the additional relevant information is received, by the server machine, from at least one of the other information processing devices after the stored reproduction data is transmitted to the one or more other information processing devices.

28. The information processing device according to claim 18, wherein the generated reproduction data and the accepted relevant information are transmitted to the server after execution of the game application is terminated.

29. The information processing device according to claim 18, wherein the reproduction data includes data representing game operations performed during execution of the game application on the information processing device, and data representing movements of one or more virtual objects during execution of the game application on the information processing device.

30. The server machine according to claim 19, wherein the stored reproduction data is transmitted to the at least one of the plurality of other information processing devices making the request after the relevant information is transmitted to the plurality of other information processing devices.

31. The server machine according to claim 19, wherein the computer system is further configured to:
- convert the stored reproduction data into moving image data;
- after the relevant information is transmitted to the plurality of other information processing devices, receive, from at least one of the plurality of other information processing devices, a request for the converted moving image data; and
- in response to the request for the moving image data, transmit the converted moving image data to the at least one of the plurality of other information processing devices making the request.

32. The non-transitory recording medium according to claim 20, wherein the generated reproduction data and the accepted relevant information are transmitted to the server after execution of the game application is terminated.

33. The non-transitory recording medium according to claim 21, wherein
the stored reproduction data is transmitted to the at least one of the plurality of other information processing devices making the request after the relevant information is transmitted to the plurality of other information processing devices.

34. The information processing system of claim 1, wherein the server machine include a first server and a second server, the received reproduction data and the received relevant information are stored in association with each other in storage of the first server, and the second server is configured to:
receive the reproduction data;
generate moving image data by reproducing the game play from the reproduction data;
store, in storage associated with the second server, the generated moving image data;
transmit, to the first server, an address where the generated moving image data is stored; and
in response to a request including the address, from one or more other information processing devices, transmit the generated moving image data to the one or more other information processing devices; and wherein
the first server is configured to store the address in association with the stored reproduction data and the stored relevant information, and transmit the address together with the relevant information transmitted to the plurality of other information processing devices.

35. The information processing device of claim 18, wherein the computer system is further configured to:
receive, from the sever, reproduction data generated by another device during execution of a game application by the another device;
generate game play based on the received reproduction data, the generated game play including operations performed on the another device during execution of the game application by the another device; and
display, on the display, the generated game play.

36. The information processing device of claim 18, wherein the computer system is further configured to edit the generate reproduction data to remove a portion of the game play and/or change a virtual space viewpoint in the game play.

37. The information processing method of claim 22, further comprising:
automatically selecting only a portion of the generated reproduction data to be transmitted to the server machine;
receiving, from one of the other information processing devices, edit operations for the portion of the generated reproduction data transmitted to the server machine, wherein the edit operations include changing at least a virtual space viewpoint in the process of the game play;
generating, based on the edited reproduction data, game play; and
displaying, on the display at the information processing device, the generated game play.

38. An information processing system comprising a plurality of information processing devices and a server machine, wherein
each information processing device comprising a display, an operation unit and a computer system comprising at least one processor, the computer system coupled to the display and the operation unit and being at least configured to:
execute a game application to perform processing involved in a game;
during execution of the game application, receive, from the operation unit, input data for controlling operations in the game;
during execution of the game application, generate reproduction data to be used for reproducing game play processed during the game;
accept input of relevant information for the generated reproduction data; and
transmit the generated reproduction data and the accepted relevant information to the server machine; and
the server machine includes at least one processor, the server machine being at least configured to:
receive the generated reproduction data and the accepted relevant information transmitted from the information processing device;
store, in storage associated with the server machine, the received reproduction data and the received relevant information in association with each other;
receive, from one or more other information processing devices, additional relevant information;
store, in the storage associated with the server machine, the received additional relevant information in association with the received reproduction data;
transmit the stored relevant information and the additional relevant information in association with the stored reproduction data to a plurality of other information processing devices;
in response to a request from one or more other information processing devices, transmit the stored reproduction data to the one or more other information processing devices; and
the computer system of the information processing device being further configured to:
receive, from the server machine, the additional relevant information received from the one or more other information processing devices;
generate an image including a list of the received additional relevant information, the list including an icon for executing reproduction of game play based on generate reproduction data associated with the additional relevant information;
display, on the display, the generated image including the list of the received additional relevant information and the icon;
in response to an operation to the displayed icon, transmit, to the server machine, a request for the reproduction data associated with the additional relevant information;
receive, from the server machine, the reproduction data associated with the additional relevant information; and
display, on the display, the reproduction of game play based on the received reproduction data associated with the additional relevant information.

* * * * *